United States Patent
Ge et al.

(10) Patent No.: US 9,401,924 B2
(45) Date of Patent: Jul. 26, 2016

(54) MONITORING OPERATIONAL ACTIVITIES IN NETWORKS AND DETECTING POTENTIAL NETWORK INTRUSIONS AND MISUSES

(71) Applicant: AT&T Intellectual Property I, L.P., Atlanta, GA (US)

(72) Inventors: Zihui Ge, Secaucus, NJ (US); Jie Chu, Elmhurst, NY (US); Richard Huber, Eatontown, NJ (US); Ping Ji, Secaucus, NJ (US); Jennifer Yates, Morristown, NJ (US); Yung-Chao Yu, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 225 days.

(21) Appl. No.: 13/721,698

(22) Filed: Dec. 20, 2012

(65) Prior Publication Data

US 2014/0181968 A1    Jun. 26, 2014

(51) Int. Cl.
*G11C 11/00* (2006.01)
*H04L 29/06* (2006.01)

(52) U.S. Cl.
CPC ........ *H04L 63/1416* (2013.01); *H04L 63/1425* (2013.01)

(58) Field of Classification Search
CPC . H04L 63/1416; H04L 63/1425; H04L 63/20; H04L 63/1466; H04L 63/14; H04L 63/145; H04L 43/045; H04L 43/06; H04L 43/106; H04L 43/16; H04L 63/0218; H04L 63/0263; H04L 63/1433; H04L 63/1441
USPC .......................................................... 726/23
See application file for complete search history.

(56) References Cited

U.S. PATENT DOCUMENTS

| | | | |
|---|---|---|---|
| 6,304,904 B1 * | 10/2001 | Sathyanarayan et al. | 709/224 |
| 8,813,228 B2 * | 8/2014 | Magee et al. | 726/24 |
| 2007/0261112 A1 * | 11/2007 | Todd et al. | 726/11 |
| 2008/0127335 A1 * | 5/2008 | Khan et al. | 726/22 |

(Continued)

OTHER PUBLICATIONS

Anderson, J.P.: Computer security threat monitoring and surveillance. Technical Report James P Anderson Co Fort Washington Pa p. 56 (1980).
D. Carrel, L.G.: The TACACS+ protocol (Jan. 1997).

(Continued)

*Primary Examiner* — Dant Shaifer Harriman
*Assistant Examiner* — Abiy Getachew
(74) *Attorney, Agent, or Firm* — Hartman & Citrin LLC

(57) ABSTRACT

Concepts and technologies disclosed herein are for monitoring operational activities in networks and detecting potential network intrusions and misuses. According to one aspect disclosed herein, an intrusion detection system can collect logs from an authentication, authorization, and accounting system. The intrusion detection system can extract information from the logs, update intrusion detection information utilized by an intrusion detection rule based upon the information extracted from the logs, update a profile utilized by the intrusion detection rule, compare the profile and the intrusion detection rule against a running state of an on-going session, tag corresponding log entries with a threat score, calculate the threat scores from the corresponding log entries to create an aggregated threat score, and present the aggregated threat score. The intrusion detection system can also present an alarm if the aggregated threat score triggers an alarm condition.

18 Claims, 31 Drawing Sheets

(56) References Cited

U.S. PATENT DOCUMENTS

2011/0083181 A1* 4/2011 Nazarov ............... 726/23
2012/0030767 A1* 2/2012 Rippert et al. ............... 726/25

OTHER PUBLICATIONS

Dreger, H., Feldmann, A., Mai, M., Paxson, V., Sommer, R.: Dynamic application-layer protocol analysis for network intrusion detection. In: Proceedings of the 15th conference on USENIX Security Symposium—vol. 15. USENIX Association, Berkeley, CA, USA (2006).

Iglesias, J.A., Ledezma, A., Sanchis, A.: Creating user profiles from a command-line interface: A statistical approach. In: Proceedings of the 17th International Conference on User Modeling, Adaptation, and Personalization: formerly UM and AH. pp. 90-101. UMAP '09, Springer-Verlag, Berlin, Heidelberg (2009).

Krishnamurthy, B., Sen, S., Zhang, Y., Chen, Y.: Sketch-based change detection: methods, evaluation, and applications. In: Proceedings of the 3rd ACM SIGCOMM conference on Internet measurement. pp. 234-247. IMC '03, ACM, New York, NY, USA (2003).

Li, Z., Xia, G., Gao, H., Tang, Y., Chen, Y., Liu, B., Jiang, J., Lv, Y.: Netshield: massive semantics-based vulnerability signature matching for high-speed networks. In: Proceedings of the ACM SIGCOMM 2010 conference on SIGCOMM. pp. 279-290. SIGCOMM '10, ACM, New York, NY, USA (2010).

Lunt, T.F., Jagannathan, R., Lee, R., Listgarten, S., Edwards, D.L., Neumann, P.G., Javitz, H.S., Valdes, A., Lunt, T.F., Jagannathan, R., Lee, R., Listgarten, S., Edwards, D.L., Neumann, P.G., Javitz, H.S., Valdes, A.: Ides: The enhanced prototype—a real-time intrusiondetection expert system. Tech. rep., SRI International, 333 Ravenswood Avenue,Menlo Park (1988).

Maggi, F., Matteucci, M., Zanero, S.: Detecting intrusions through system call sequence and argument analysis. IEEE Transactions on Dependable and Secure Computing 7, 381-395 (2010).

Maxion, R.: Masquerade detection using enriched command lines. 2003 International Conference on Dependable Systems and Networks, 2003. Proc.. (Jun.), 5-14 (2003).

Paxson, V.: Bro: a system for detecting network intruders in real-time. Comput. Netw. 31, 2435-2463 (Dec. 1999).

Rigney, C., Willens, S., Rubens, A., Simpson, W.: Remote authentication dial in user service (radius) (2000).

Robertson, W., Maggi, F., Kruegel, C., Vigna, G.: Effective Anomaly Detection with Scarce Training Data. In: Proceedings of the Network and Distributed System Security Symposium (NDSS). San Diego, CA (Feb. 2010).

Roesch, M.: Snort—lightweight intrusion detection for networks. In: Proceedings of the 13th USENIX conference on System administration. pp. 229-238. LISA '99, USENIX Association, Berkeley, CA, USA (1999).

Song, Y., Keromytis, A.D., Stolfo, S.J.: Spectrogram: A mixture-of-markov-chains model for anomaly detection in web traffic. In: NDSS. The Internet Society (2009).

Axelsson, Stefan.: Intrusion detection systems : A survey and taxonomy. Technical Report 99 (Technical report 99-15), 1-15 (2000).

Suo, X., Zhu, Y., Owen, G.S.: Graphical passwords: a survey. In: Proceedings of the 21st Annual Computer Security Applications Conference. pp. 463-472. IEEE Computer Society, Washington, DC, USA (2005).

Maronna, R., Martin, R., Yohai, V.: Robust statistics: theory and methods. Wiley series in probability and statistics, J. Wiley, pp. 1-5, (2006).

Salem, M.B., Stolfo, S.J.: Detecting Masquerades: A comparison of one-class bag-of-words user behavior modeling techniques. Journal of Wireless Mobile Networks, Ubiquitous Computing, and Dependable Applications, vol. 1, No. 1, pp. 3-13, (2010).

Jie Chu, Zihui Ge, Richard Huber, Ping Ji, Jennifer Yates, and Yung-Chao Yu, "ALERT-ID: Analyze Logs of the network Element in Real Time for Intrusion Detection," Proceedings of the 15th international conference on Research in Attacks, Intrusions, and Defenses, pp. 294-313, (Sep. 2012).

* cited by examiner

US 9,401,924 B2

MONITORING OPERATIONAL ACTIVITIES IN NETWORKS AND DETECTING POTENTIAL NETWORK INTRUSIONS AND MISUSES

TECHNICAL FIELD

The concepts and technologies disclosed herein generally relate to network security. More particularly, the concepts and technologies disclosed herein relate to monitoring operational activities in networks and detecting potential network intrusions and misuses.

BACKGROUND

A fundamental aspect of network security is securing the networking infrastructure, which can be particularly challenging in a large scale enterprise or Internet service provider ("ISP") networks. In such networks, hundreds or even thousands of networking devices, such as routers and switches, are widely dispersed among a geographically diverse set of offices and are typically managed by a team of network operators. It is imperative that the networking infrastructure and the information contained therein be fully protected against any malicious priers and attackers. For example, information such as router configuration and traffic statistics available at networking devices may contain confidential business data of tremendous value to a business competitor. Divulging such information will likely result in a significant disadvantage to the ISP's business. Leakage of some critical security information in the router configuration, such as Quality of Service ("QoS") policy, firewall settings, and/or Access Control List ("ACL") settings, may subject the network to crafted and targeted attacks such as Distributed Denial of Service ("DDoS") attacks. In an even more devastating scenario, malicious attackers gaining privileged access to the networking device might alter the network configuration to create havoc and paralyze the entire network and the services it supports.

Given the risk of severe consequences, large scale network operators typically devise and deploy a range of security and protection measures for their networking devices. One common practice, for example, is to utilize a combination of periphery protection and centralized authentication and authorization for communication to networking devices. By restricting premises access, unauthorized persons are blocked from gaining physical access to networking devices. Through careful configuration of ACLs at all network edge routers, unauthorized network traffic is also blocked from reaching network devices. And finally, technologies such as Terminal Access Controller Access-Control System Plus ("TACACS+") and Remote Authentication Dial In User Service ("RADIUS") ensure that only authenticated users (i.e., authorized network operators and/or administrators) have access to routers and switches either directly or remotely over the network.

SUMMARY

Concepts and technologies are disclosed herein for monitoring operational activities in networks and detecting potential network intrusions and misuses. According to one aspect disclosed herein, an intrusion detection system can collect logs from an authentication, authorization, and accounting ("AAA") system. The intrusion detection system can extract information from the logs, update intrusion detection information utilized by an intrusion detection rule based upon the information extracted from the logs, update a profile utilized by the intrusion detection rule, compare the profile and the intrusion detection rule against a running state of an on-going session, tag corresponding log entries with a threat score, calculate the threat scores from the corresponding log entries to create an aggregated threat score, and present the aggregated threat score. The intrusion detection system can also present an alarm if the aggregated threat score triggers an alarm condition.

It should be appreciated that the above-described subject matter may be implemented, for example, as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
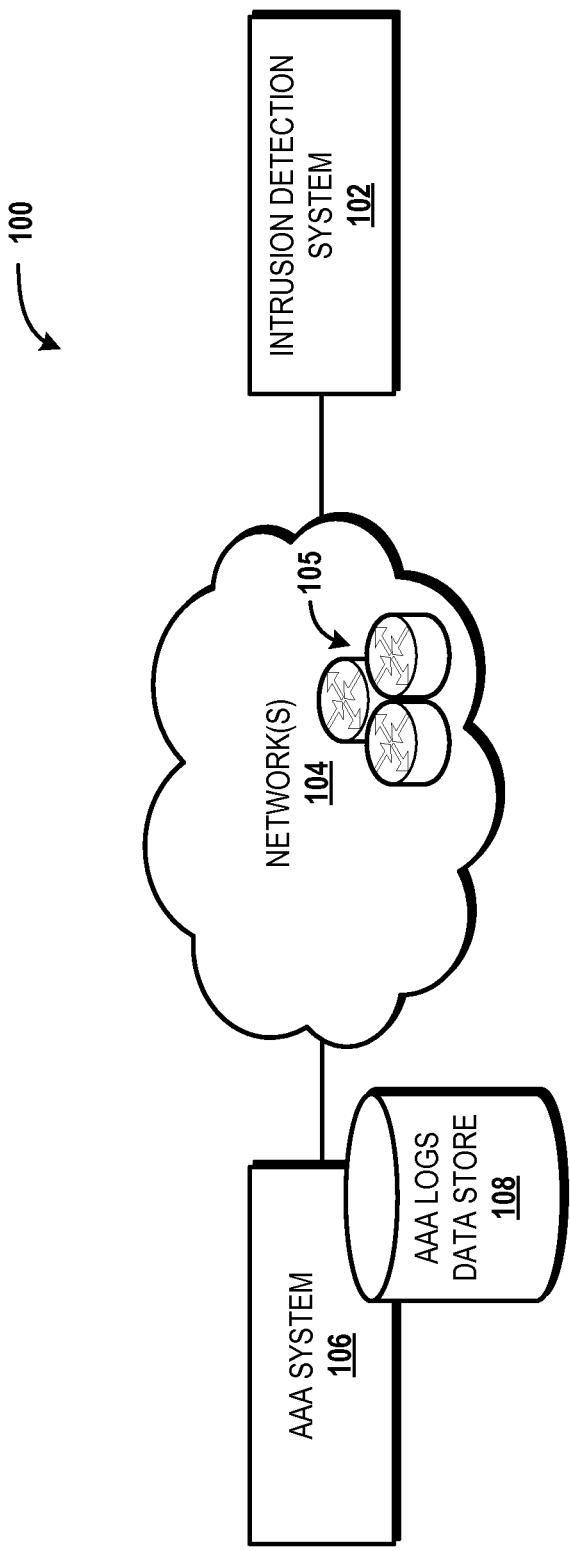
FIG. 1 is a diagram illustrating an illustrative operating environment for implementing various embodiments presented herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodologies, among others, for monitoring operational activities in networks and detecting potential network intrusions and misuses will be presented.

Referring now to FIG. 1, aspects of an operating environment 100 for various embodiments presented herein will be described. The illustrated operating environment 100 includes an intrusion detection system 102 that is operating on or in communication with one or more networks 104 (hereinafter, at times, referred to herein collectively or generically as "the network 104"). The network 104 includes one or more networking devices 105 such as, but not limited to, routers, switches, and/or the like. The network 104 may be or may include an enterprise network, an Internet service provider ("ISP") network, and/or any other network that includes one or more networking devices. In some implementations, the network 104 is a large scale enterprise network in which the networking devices 105 include hundreds or more of routers and/or switches. In some other implementations, the network 104 is a regional ISP network. In some other implementations, the network 104 is a global ISP network. The network 104 also includes or is in communication with an authentication, authorization, and accounting ("AAA") system 106 that, in turn, includes or is in communication with an AAA logs data store 108.

The security of the networking infrastructure of networks is typically achieved through mechanisms such as access control lists ("ACLs") at the edge of the network and the deployment of an AAA system governing all access to networking devices of the network. However, a misconfigured edge router or a compromised user account, for example, may put the entire network at risk of intrusion and/or misuse. In accordance with various aspects disclosed herein, existing security measures such as those described above and others can be enhanced by the intrusion detection system 102. In some implementations, the intrusion detection system 102 oversees all network management activities that occur within the network 104. In particular, networking device access logs, such as logs associated with the operation of the networking devices 105 collected via the AAA system 106 and stored in the AAA logs data store 108, can be analyzed, and features that can be used to distinguish normal operational activities of the network 104 from rogue/anomalous activities can be extracted from the AAA logs. Based upon this analysis, the intrusion detection system 102 can construct normal behavior models with respect to access patterns of the networking devices 105 and the configuration and control activities of individual accounts from historical logs. The intrusion detection system 102 can also provide alerts when the usage of the networking devices 105 deviates from the normal behavior models. The intrusion detection system 102 can effectively identify potential network intrusions and/or misuses of the networking devices 105 within the network 104 with a level of overall alarm rate that is acceptable to network security operators such as managers and other personnel.

The intrusion detection system 102 provides an additional layer of defense for networking infrastructure by overseeing, in some implementations, all activities being performed within the network 104 and automatically detecting and raising alarms for suspicious activities. The intrusion detection system 102 can communicate with the AAA system 106 to obtain networking device access logs. In some embodiments, the intrusion detection system 102 obtains networking device access logs in real-time. The intrusion detection system 102 can compare on-going networking device access activities against a set of patterns or profiles constructed from historical data, and when an anomaly is identified, the intrusion detection system 102 can trigger an alarm to network security personnel for further investigation of potential network intrusions and/or misuses of the network 104. The intrusion detection system 102 can manage false positive alarms of network intrusion or misuse by aggregating detected threat scores by origin/source IP addresses and login accounts.

Real-time is defined herein as the actual time during which a process or an event occurs. The intrusion detection system 102, in some embodiments, can receive logs from the AAA system 106 in real-time, meaning the logs are available for use by the intrusion detection system 102 within milliseconds so that the logs are available virtually immediately to the intrusion detection system 102 from when the logs are created by the AAA system 106. Real-time is also used herein interchangeably with live and instantaneous. The present inherent latencies of communications and computer processes may prevent real-time processes, such as the receipt and subsequent analysis of logs by the intrusion detection system 102, from occurring within an infinitesimal amount of time. It should be understood, however, that real-time is also used herein to broadly encompass zero time. In some embodiments, the AAA system 106 and the intrusion detection system 102 are combined and, as a result, communication latency between these systems can be mitigated or eliminated.

The AAA system 106, in some embodiments, executes commercially available AAA software, such as Terminal Access Controller Access-Control System Plus ("TACACS+") or Remote Authentication Dial In User Service ("RADIUS"). In some other embodiments, the AAA system 106 executes proprietary AAA software. In any case, the AAA system 106 can include one or more server computers executing AAA software to perform various operations, including, for example, verifying network user identities on login (i.e., authentication), verifying access privileges on a per command basis (i.e., authorization), and recording user activities in logs (i.e., accounting). In some embodiments, the multiple replicated server computers are included in the AAA system 106 to provide redundancy for AAA operations.

The AAA system 106 can create one or more logs and store the log(s) in the AAA log data store 108. A log can contain one or more entries. An entry can contain information such as, but not limited to, a timestamp of an access request, an IP address of a targeted network device (e.g., loopback address), an IP address of a remote user device requesting access, a user's login identification ("ID"), a command line executed, and/or other information such as user terminal, privilege level, and/or time zone.

The networking devices 105 can be configured with the IP address of the AAA system 106, or the IP addresses of multiple servers that are included in the AAA system 106. The network 104 can be divided into multiple zones, for example, by the device type(s) or by an autonomous system to which the one or more of the networking devices 105 belong. Different zones may contain different user account and/or access privilege settings.

As explained above, the intrusion detection system 102 can monitor all operational activities within the network 104 and detect potential network intrusions and/or misuses of the network 104. In order to provide this functionality, the intrusion detection system 102 utilizes one or more rules created based upon an examination of various characteristics of normal activities recorded in AAA logs with a focus on aspects that can be used to distinguish normal activities from actions that an external or internal attacker might take. The following description provides an analysis used to develop various illustrative rules described herein that can be utilized by the intrusion detection system 102. Moreover, the following description refers to data collected from a global tier-1 ISP network that generates tens of millions of TACACS+ log entries from tens of thousands of routers per day. It should be understood that the rules created as a result of this analysis are merely illustrative, and should not be construed as being limiting in any way to the rules that may be utilized by the intrusion detection system 102.

A way to separate potential attacks on the network 104 from legitimate accesses is to check whether users can readily pass authentication. Attackers may expose themselves by inputting wrong login credentials. However, it also expected that legitimate users might "fat finger" their login ID and password or other credentials, or might otherwise fail to input correct credentials from time to time. Thus, failed login attempts in an example set of normal AAA logs are now considered.

Figure 2A:
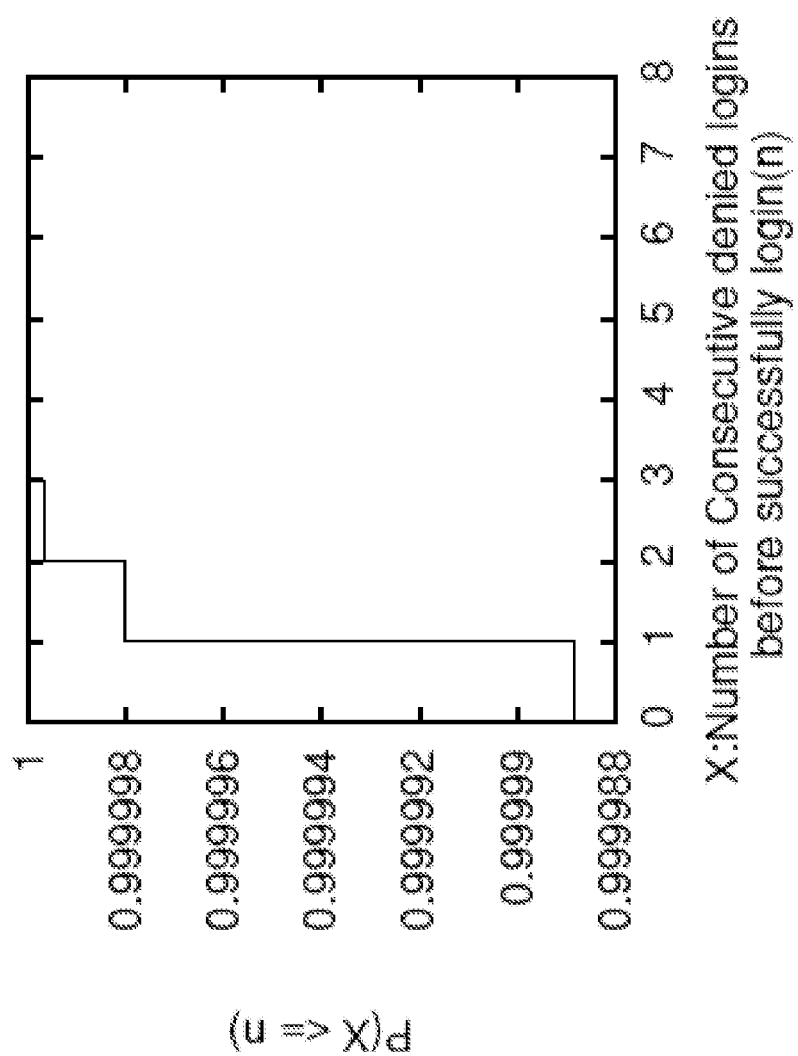
FIGS. 2A-2L are graphs showing characteristics of normal operation activities within an example network.

FIG. 2A shows a cumulative distribution function ("CDF") of an example number of consecutive login attempts before a successfully authenticated login. Considering a login request within one minute of a preceding login request with the same origin IP, the same login ID, and the same target networking device as a consecutive login, it can be observed that more than 99.992% of logins pass authentication the first time, more than 85% of the remaining logins include input of the correct credentials the next time, and it is extremely rare that a user fails to input the correct credentials more than five time before entering the correct credentials. The ratio of login failure is considerably lower than that typically seen in computer systems. This is likely due to the predominance of logins generated by automated network management tools—a unique characteristic of network infrastructure operations. The CDF shown in FIG. 2A demonstrates the potential of alarming on intruders when a small number of repeated failed logins are observed.

Figure 2B:
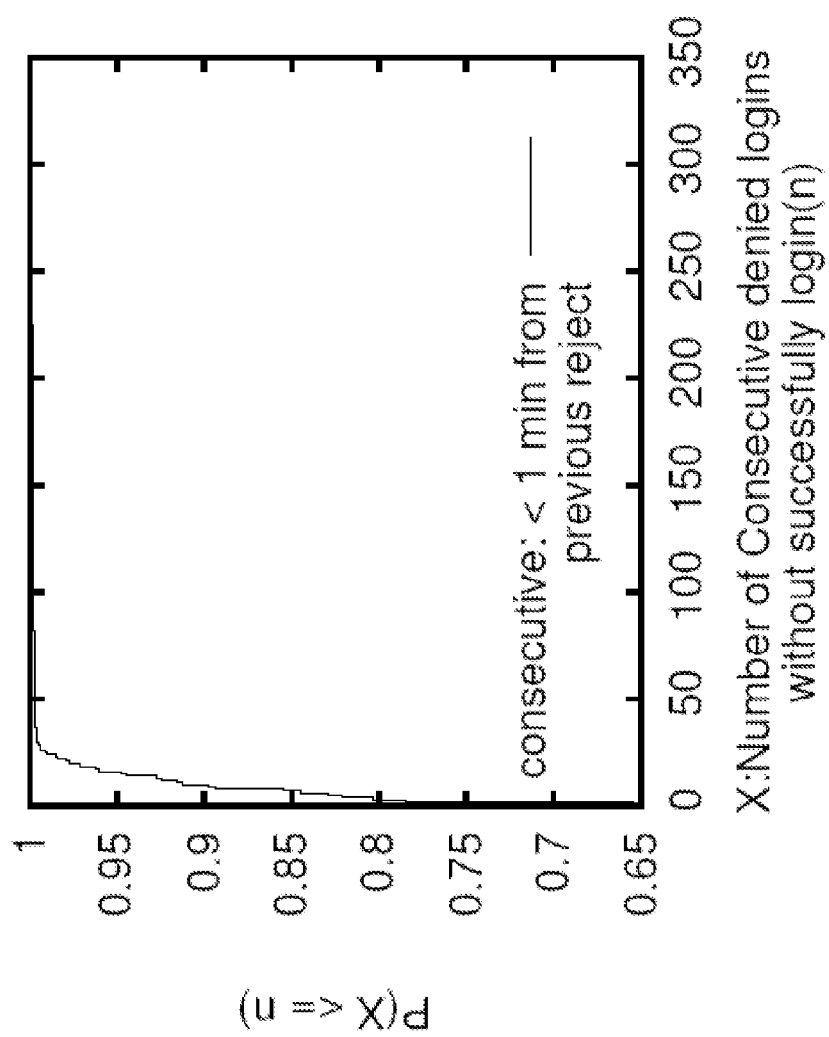

The above type of monitoring can be defeated if the attacker has a list of valid login IDs and device names because the attacker can use a different login ID or target a different device when a login attempt fails. Detection of a possible attack can be improved by looking for consecutive login failures from a common origin IP address irrespective of the login ID attempted. FIG. 2B shows the CDF of an example number of consecutive failed login attempts from a common origin IP address. "Consecutive" in the illustrated example is less than one minute apart from a preceding login failure. Consecutive in other analyses may be defined as a longer or shorter time period. It can be observed from FIG. 2B that around 85% of the rejected login attempts are either rectified or abandoned in six times or fewer. However, there are some login attempts that reach a few hundred consecutive failed login attempts. This may be due to network management scripts running out of sync with router command line interface ("CLI") (e.g., sending password when login ID is expected or vice versa). This rarely occurs, but when it does it produces many consecutive login failures—and should correctly trigger an alarm.

Figure 6:
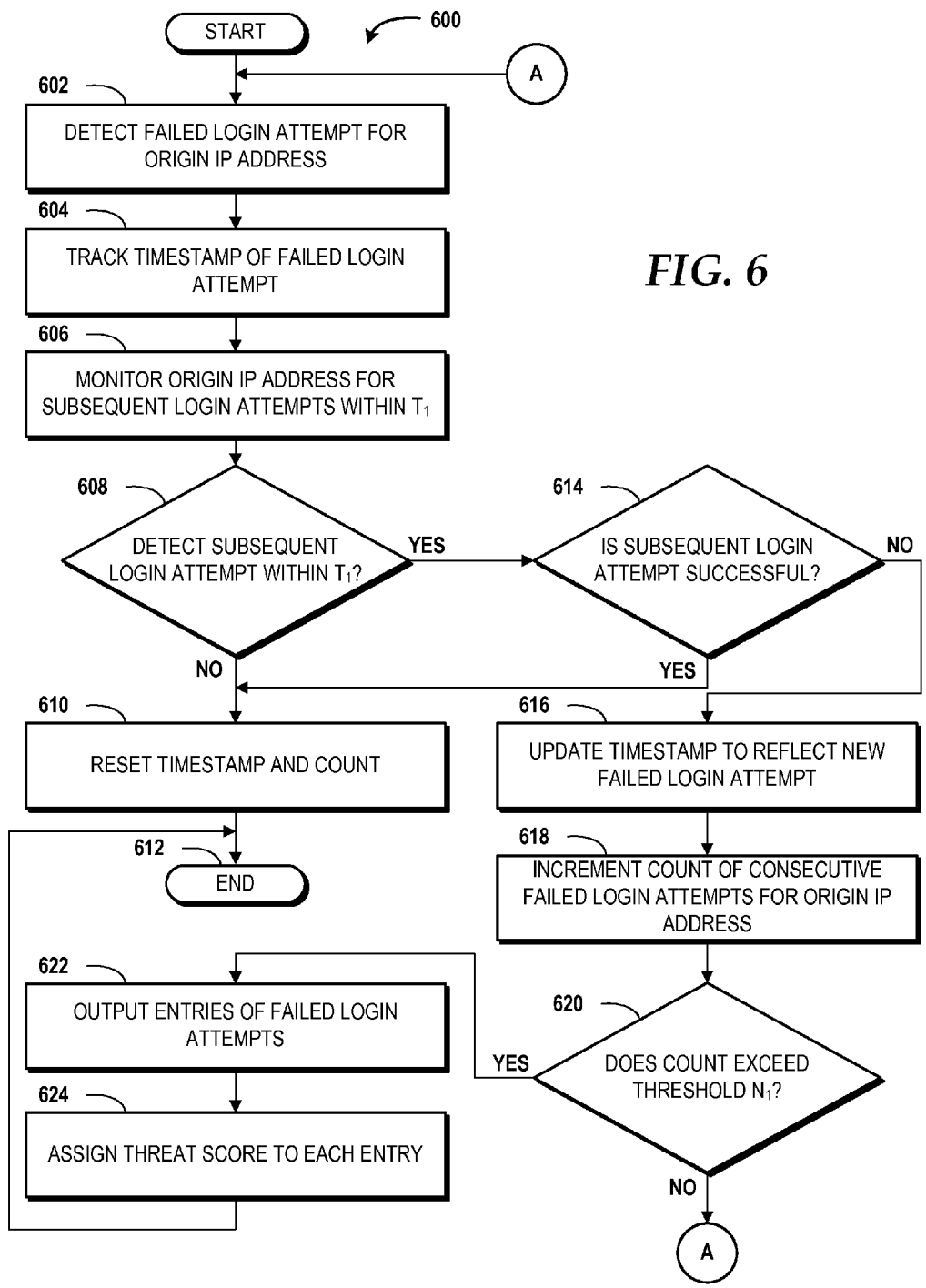

Based upon the above analysis, a rule can be created that checks whether users can readily pass authentication. This rule can take into account occasional failed but legitimate login attempts (i.e., login attempts from a non-malicious user) in the assessment of login attempts. The intrusion detection system 102 can utilize this rule to consider failed login attempts to detect potential network intrusions and/or misuses of the network 104. FIG. 6 illustrates an illustrative method for implementing this rule, and is described in greater detail herein below.

An AAA log entry can contain login access information characterized by a user login ID, an origin IP address, and a target router IP address. A "login access session" is defined herein as the network management activities that share a common triple of the above login access information and being close in time (e.g., with an idle timeout of 10 minutes). Login access information can be valuable in capturing potential attackers. For example, an origin IP address that is not part of a block of IP addresses previously seen as an originating IP address in the logs is a strong indication that the network periphery protection of the network 104 may have a hole. Furthermore, each network operator will typically have a stable set of work locations from which he or she manages the network 104, and due to his or her role, there can be a fixed set of networking devices of the networking devices 105 that the operator typically manages. Consequently, the source and destination IP addresses will tend to be consistent over time for many operators.

Figure 2C:
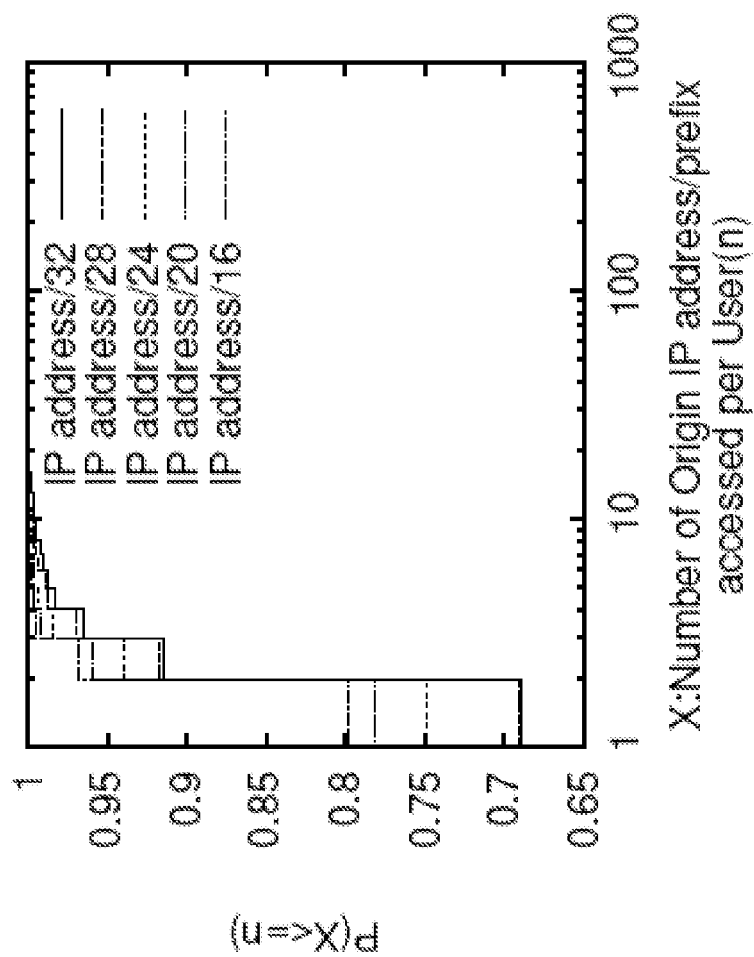

FIG. 2C shows the CDF of an example number of distinct origin IP addresses associated with a login ID in a month. It can be observed from FIG. 2C that 68% of login IDs manage the network from only one IP address. If common origin subnets with varying size are considered, the percentage increases to 75% for /24 IP prefixes and 80% for /16 IP prefixes. Hereinafter, /24 IP prefixes are used when aggregating origin IP addresses. It should be understood, however, that the use of /32 and other routing prefixes are contemplated.

Figure 7:
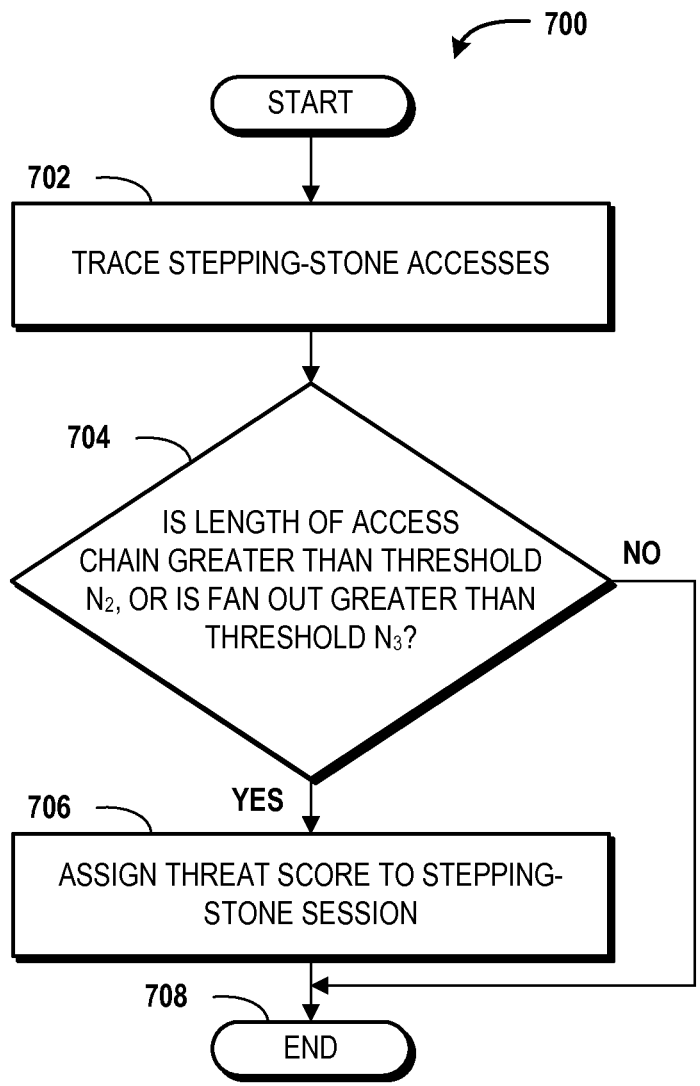

FIG. 2C also shows that even with /24 origin IP prefixes, about 1% of the login IDs access the network from more than 10 distinct IP prefixes. A further analysis of the distinct IP prefixes reveals that there are cases when an operator first logs on from a gateway server to a first router, and then logs on to one or more other routers from the first router. The loopback IP address of the first hop router appears as the origin IP for the second access session. While such "stepping-stone" access sessions are not common, these sessions do occur—operators use this either for convenience or under certain network conditions, for example, when direct access to the other routers is unavailable. In order to account for these cases, a rule can be created to exclude sessions that originate from one of the networking devices 105, thereby removing "stepping-stone" sessions from consideration. FIG. 7 illustrates an illustrative method for implementing this rule, and is described in greater detail herein below.

Figure 2D:
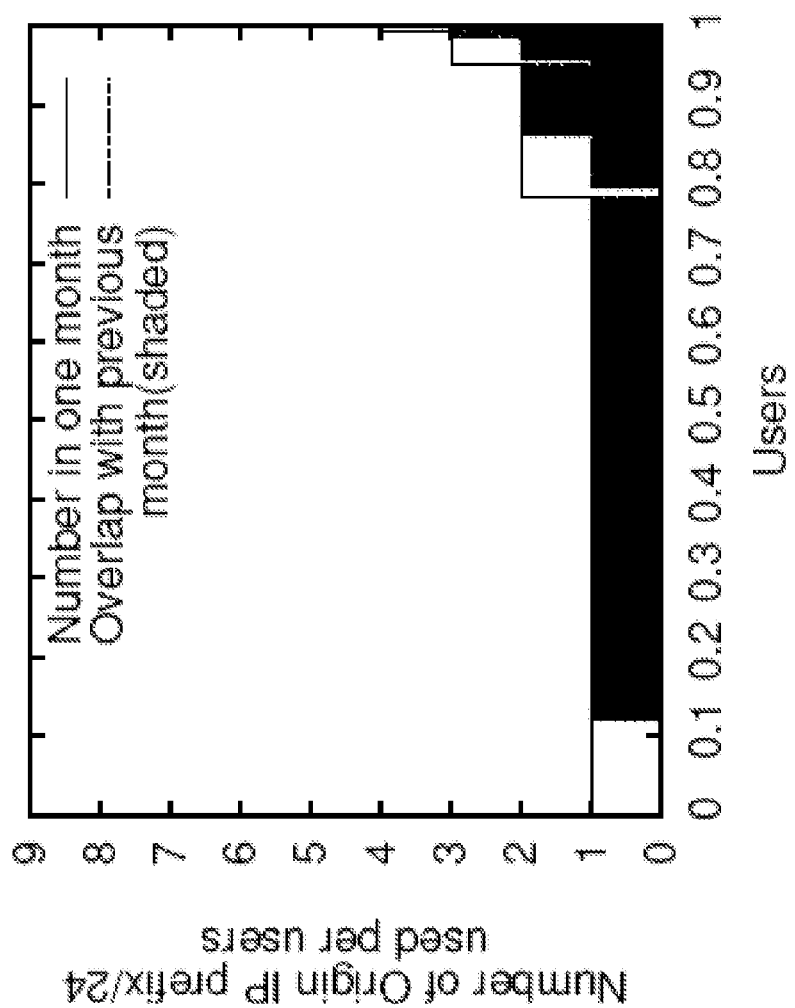

Turning now to FIG. 2D, the solid line shows a plot of an example number of distinct origin IP prefixes against a rank of login IDs between 0 and 1. It can be observed from FIG. 2D that above 78% of users have only one (non-stepping-stone) origin IP prefix and no one logs on from more than 4 distinct IP prefixes. This indicates that there exists a strong stability in the access pattern characterized by login ID and origin IP prefix combination. Deviation from such access patterns can be a symptom of an attack. FIG. 2D also shows the stability of this access pattern month by month—the shaded area indicates that the same login ID and IP prefix association has appeared in the preceding month. The unshaded area is mostly due to new users or infrequent users who only access the network in the second month.

Figure 2E:
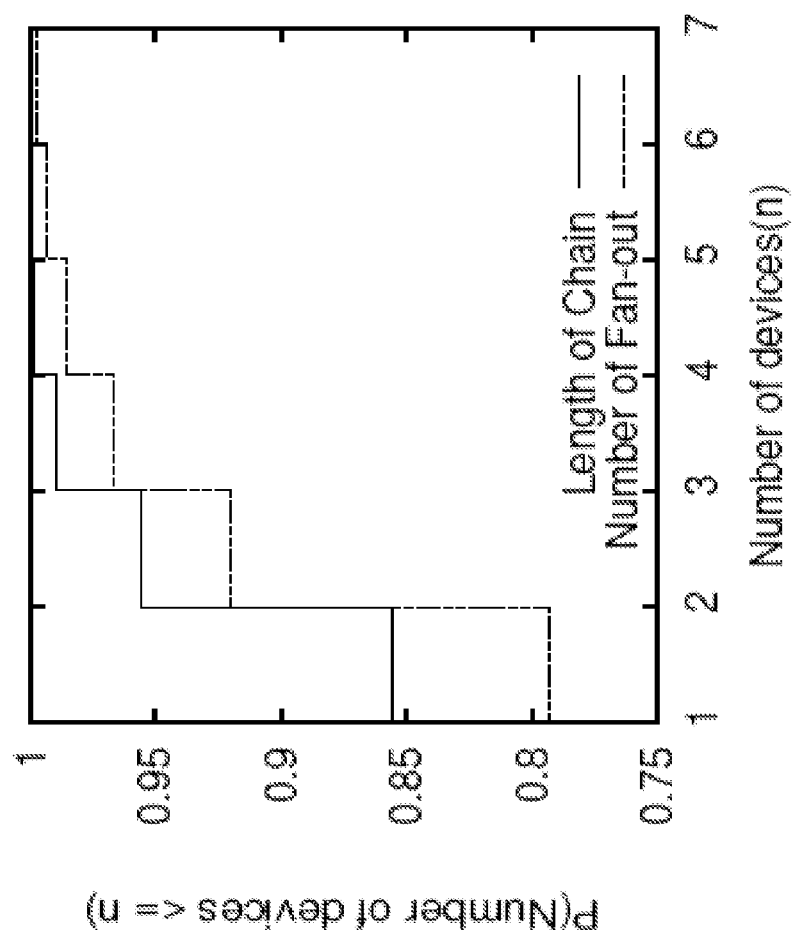

Referring again to the "stepping-stone" sessions introduced above, by matching the ssh command on the first hop router and the remote login request on the second router, a chain of stepping-stones can be reconstructed. FIG. 2E shows the CDF of an example number of routers in a "stepping-stone" chain. The CDF shows the length of stepping-stone chains and the outbound fan-out of the stepping-stone chains. The length and outbound attributes are bound by a small number (e.g., 7) in normal operational activities. In contrast, an intruder working from a compromised router may attempt to gain information from a large number of other routers, which is likely to produce longer chains or higher fan-outs. Thus, a rule that considers the length and outbound attributes of stepping-stone chains can be an effective way to detect an intruder.

Figure 2F:
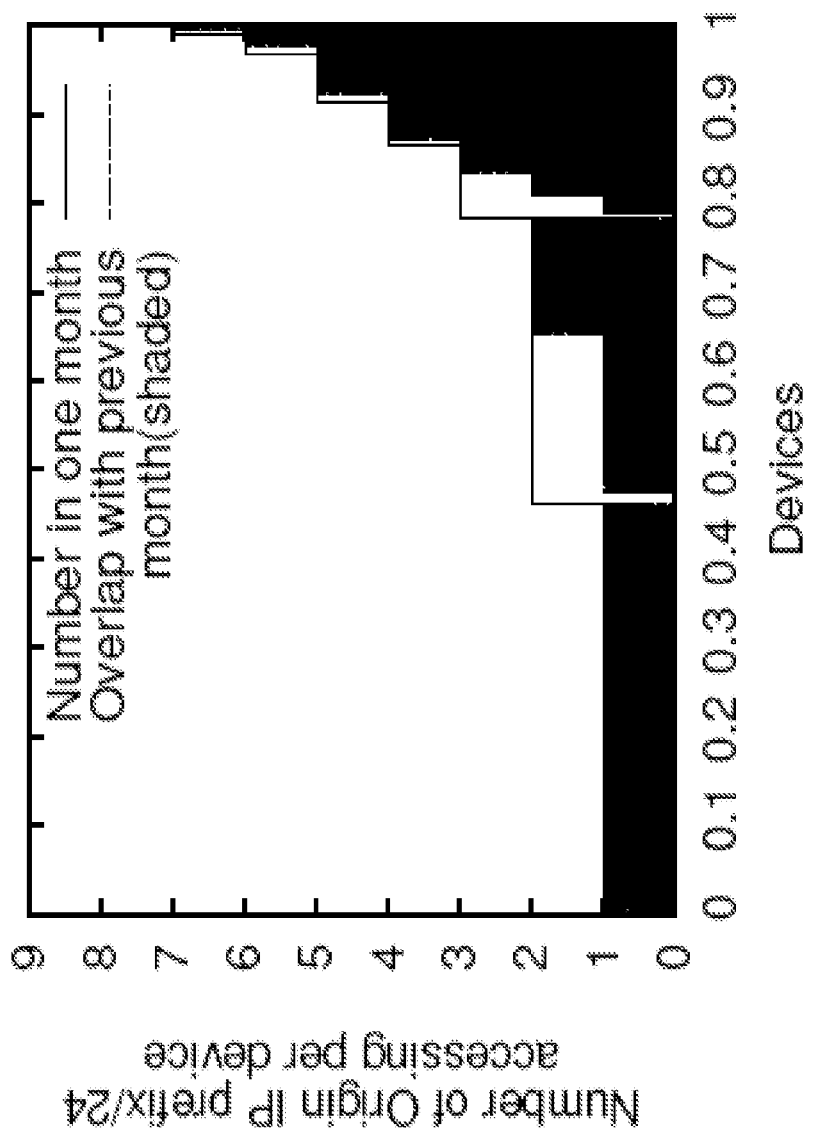

Turning now to FIG. 2F, the solid line shows a plot of an example number of distinct origin IP prefixes versus the rank of the networking device IDs. As in FIG. 2D, the ranks are normalized between 0 and 1 to protect proprietary information. It can be observed from FIG. 2F that 48% of the routers are only controlled from hosts within one /24 IP block during a one-month period. These control activities are likely routine network auditing and health monitoring. A small portion of networking devices is managed from a small number of IP prefixes (e.g., 2-7), which correspond to the network operation centers ("NOCs") responsible for those devices. Furthermore, some cross-region access can be unexpected in normal operations because it is suspicious, for example, if an operator from a regional NOC in Japan requests access to a router serving IPTV in the United States of America. Thus, a rule designed to detect abnormal associations between routers and origin IP prefixes can be an effective way of identifying such cases. The shaded area in FIG. 2F shows the overlapping associations that have appeared in the preceding month; this demonstrated the predictability of these associations, as the overlapping is very significant.

Figure 2G:
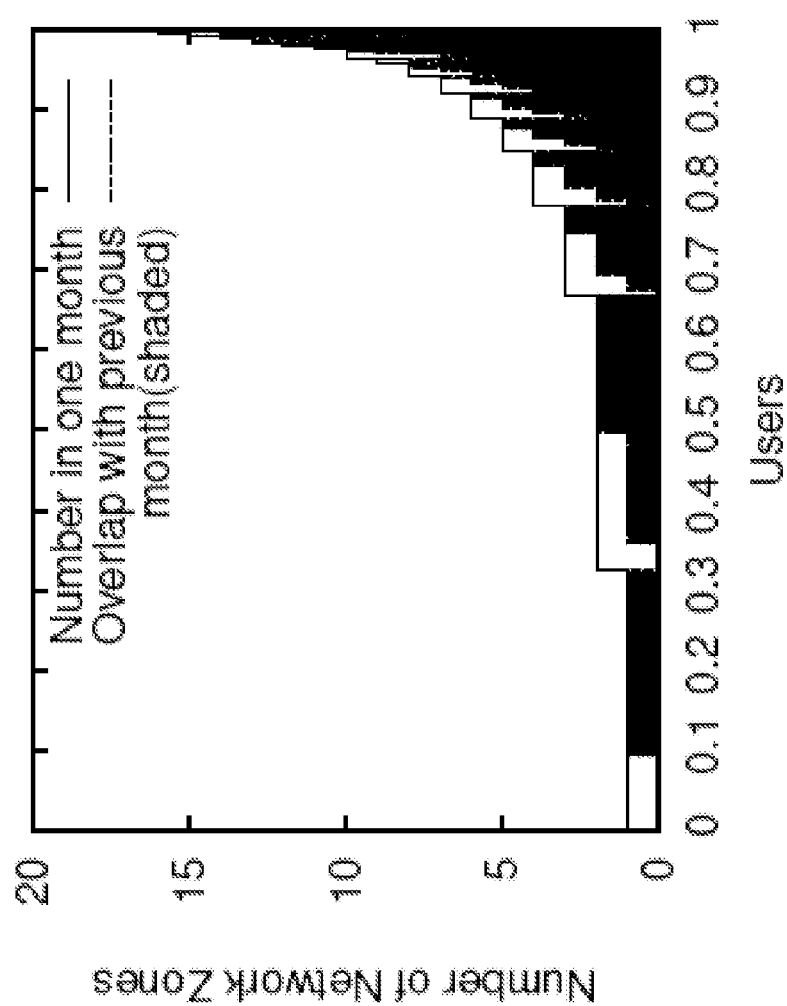

Turning now to FIG. 2G, the solid line plots an example number of distinct network zones that each login ID has accessed in one month. The x-axis in FIG. 2G has been normalized to avoid disclosing the size of the example operator work-force. It can be observed from FIG. 2G that the majority of login IDs have a very limited scope (e.g., less than 3 zones) while a few high-tier operators or software tool IDs access many zones. The stability of the login IDs' access pattern is depicted by the month over month comparison shown in the shaded area. FIG. 2G illustrates a strong predictability that can be utilized for detecting intrusions and/or misuses of the network 104.

Different login IDs (e.g., corresponding to different operators or network management tools) have different roles/functions. Each user is likely to have a stable behavior in access schedule (frequency), type of control (e.g., monitoring, troubleshooting, or configuration change), and class of commands (e.g., SONET controller settings versus ACL configurations). Significant deviation from normal behavior can be a symptom of an account becoming compromised and an intruder impersonating the owner of the login account. In the following description, the properties of such user behaviors exhibited in normal network management activities will be considered.

Figure 2H:
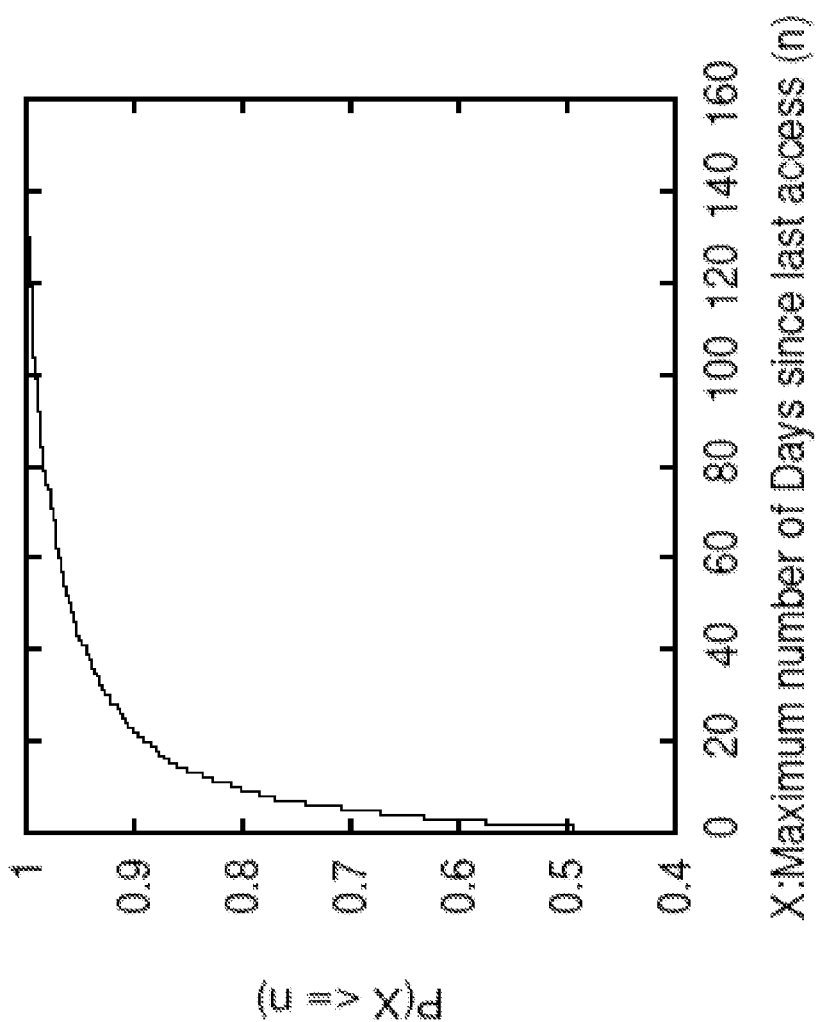

FIG. 2H shows the CDF of an example maximum gap in days between consecutive logins per login ID. A wide variability among different login IDs can be observed from FIG. 2H. Many login IDs access a network on a regular basis, with a gap of at most a few days. However, there are a considerable number of login IDs that only access the network occasionally. Accordingly, a rule can be used to profile login IDs in different groups according to each login ID's access frequency.

Figure 2I:
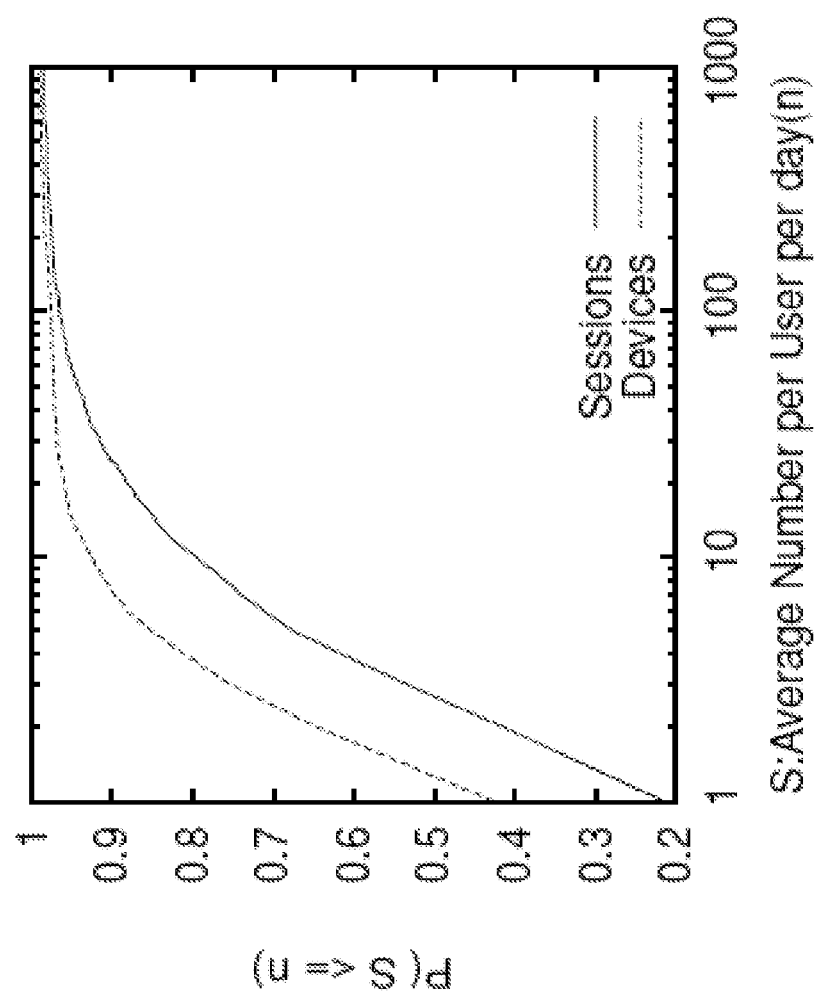

FIG. 2I shows the CDF of an example average number of login sessions per login ID per day in a representative month. The days when the login ID is not active from the average statistic are excluded from FIG. 2I. The tail part of the curve, which goes several orders of magnitude larger, is cut off so that the exact number of devices in the network is not disclosed. It can be observed from FIG. 2I that the majority of the login IDs have only a few login sessions per day. For example, 65% of IDs log onto the network no more than an average of 5 times per day. There are also many software tools and network management scripts that produce over a hundred login sessions on a daily basis. A login account suddenly changing its behavior, especially from having a small number of login sessions daily to a large number of login sessions on a given day, is unusual or abnormal behavior that should be examined further to determine if an intrusion and/or misuse of the network has occurred.

Figure 2J:
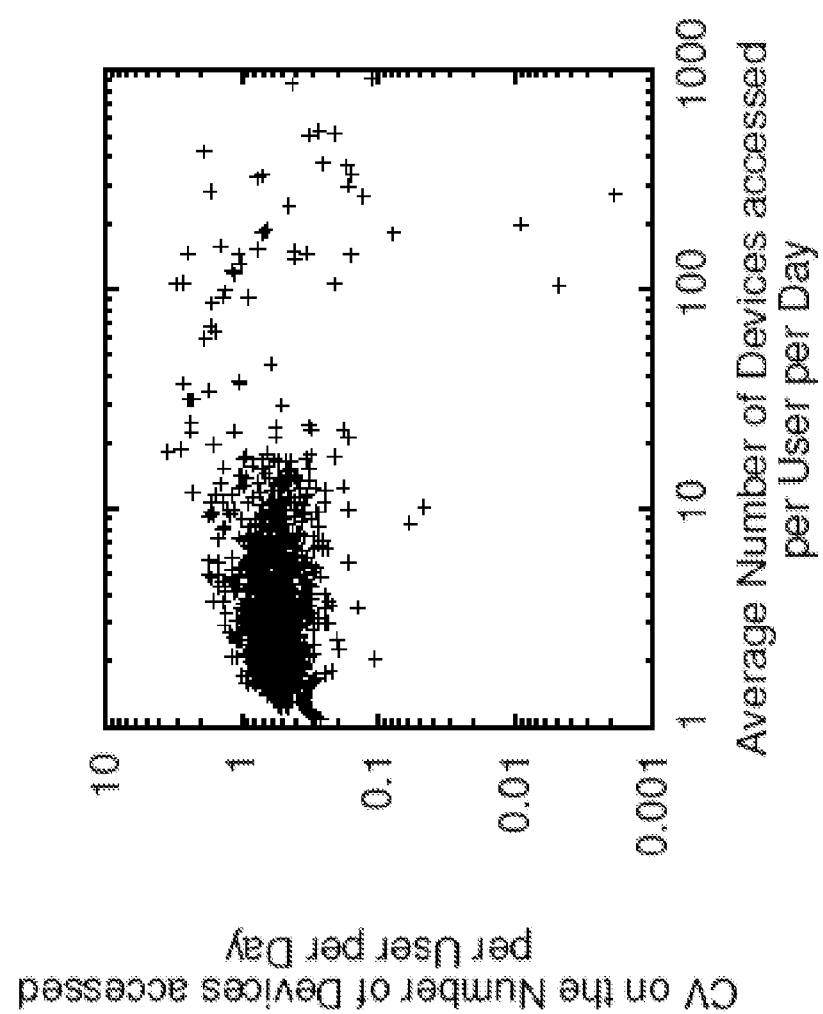

FIG. 2I also shows the CDF of an example average number of distinct networking devices accessed per login ID per day. Compared to the number of sessions represented by the solid line in FIG. 2I, the number of devices represented by the dotted line shows even more concentration—65% of login IDs log on to no more than two networking devices daily (on average). The tail portion of the curve again is dominated by software tools monitoring a large number of networking devices regularly, such as network configuration auditing tools. A surge in the number of distinct networking devices that a user initiates in a short period of time might be an intruder scouting for information. To understand the variability on this metric, FIG. 2J shows a scatter plot of the coefficient of variation ("CV") versus the mean—each point represents one login ID. It can be observed from FIG. 2J that most of the CVs are bound by a small number (e.g., 3), while the login IDs with large number of average daily device accesses typically have much smaller CVs—suggesting that the login IDs can be more tightly bounded.

The set of router control commands and configurations used by a login ID is also expected to exhibit some stability. For a login account used by a software tool, the set of commands is determined by programming and rarely changes. For an operator's login, the subset of commands should be subject to his or her privilege level and tightly related to his or her job role. However, extracting the exact association between login ID and the subset of the commands from knowledge about network operations is a challenging task— for example through code analysis of the software tools or meticulous review of all operations job functions.

In contrast, an approach that is based upon historical data analysis and is detached from the semantics of router control commands is presented herein and can be summarized as follows: (a) the commands can be tokenized (i.e., separate words in the command by white space; (b) the tokens that contain any number as parameters (e.g., IP address) can be removed; (c) any non-alphabetic characters in each of the tokens can be removed and the remainder can be converted into lower case letters, which are referred to herein as "keywords"; and (d) each user can be profiled with a set of keywords used.

Figure 2K:
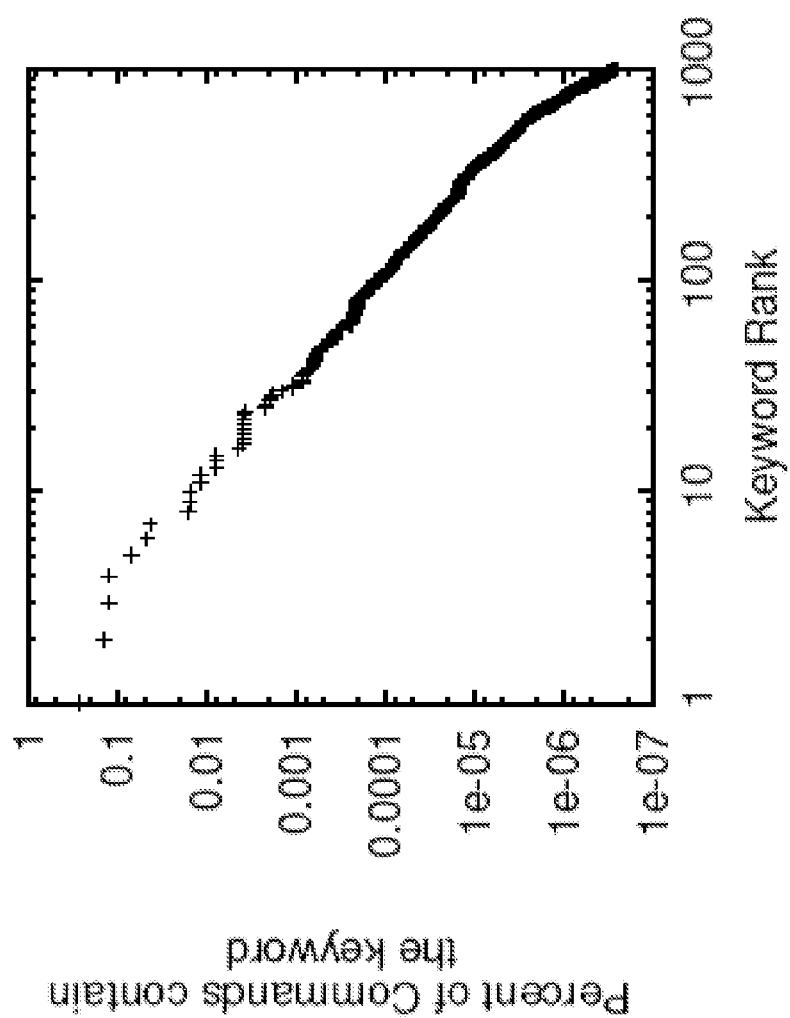

FIG. 2K shows the likelihood that a keyword is present in a command (sorted in decreasing order) based upon one month of logs. A strong skewness can be observed in the distribution shown in FIG. 2K, which can be well-modeled by Zipf's distribution. The high ranked keywords are those used in monitoring network health (e.g., ping, vff, show, etc.), and most of the bottom ranked keywords are some arbitrary tokens (such as customer name) referenced in the description field of certain router configurations or some misspellings (due to typos by operators) of other keywords. It may be sufficient to track a subset of keywords (e.g., the top 1000 keywords) and represent the remainder simply as the "other" keywords.

Figure 2L:
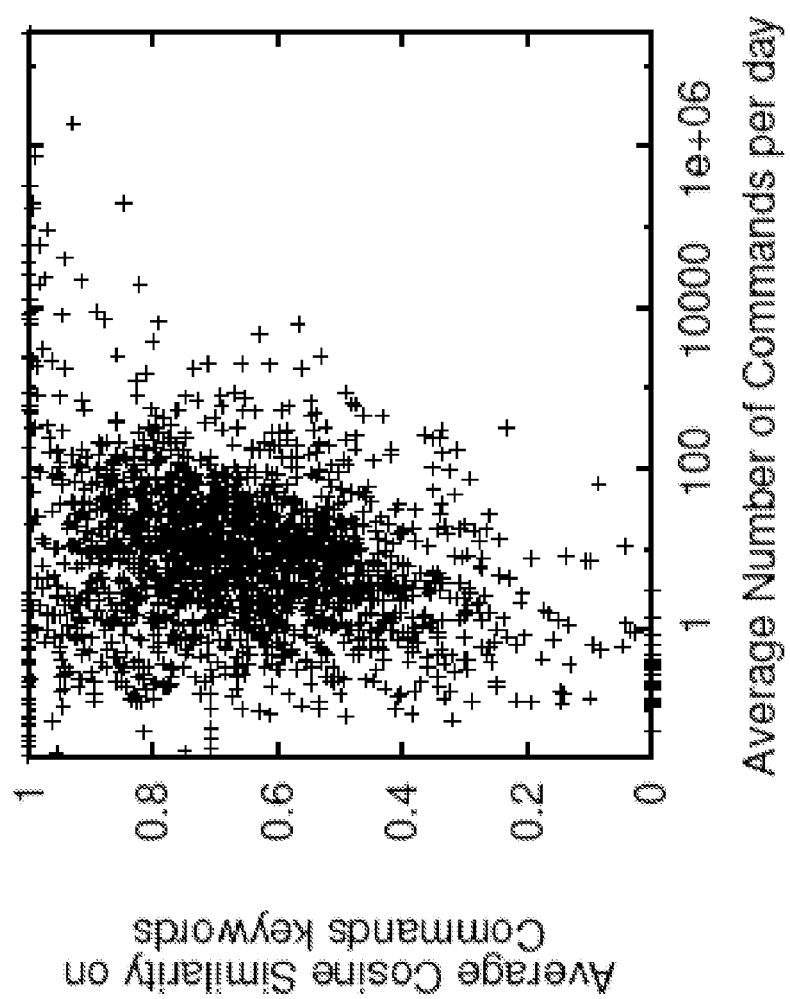

FIG. 2L shows the stability of the use of keywords per login ID, which plots the average cosine similarity of the keyword frequency distribution comparing one day against the previous active day. Login IDs with a high number of daily log entries tend to have high predictability from one day to another. Deviation of the regular command keywords, especially for a software tool account, can be a symptom of an intruder impersonating the owner of the account.

Figure 3:
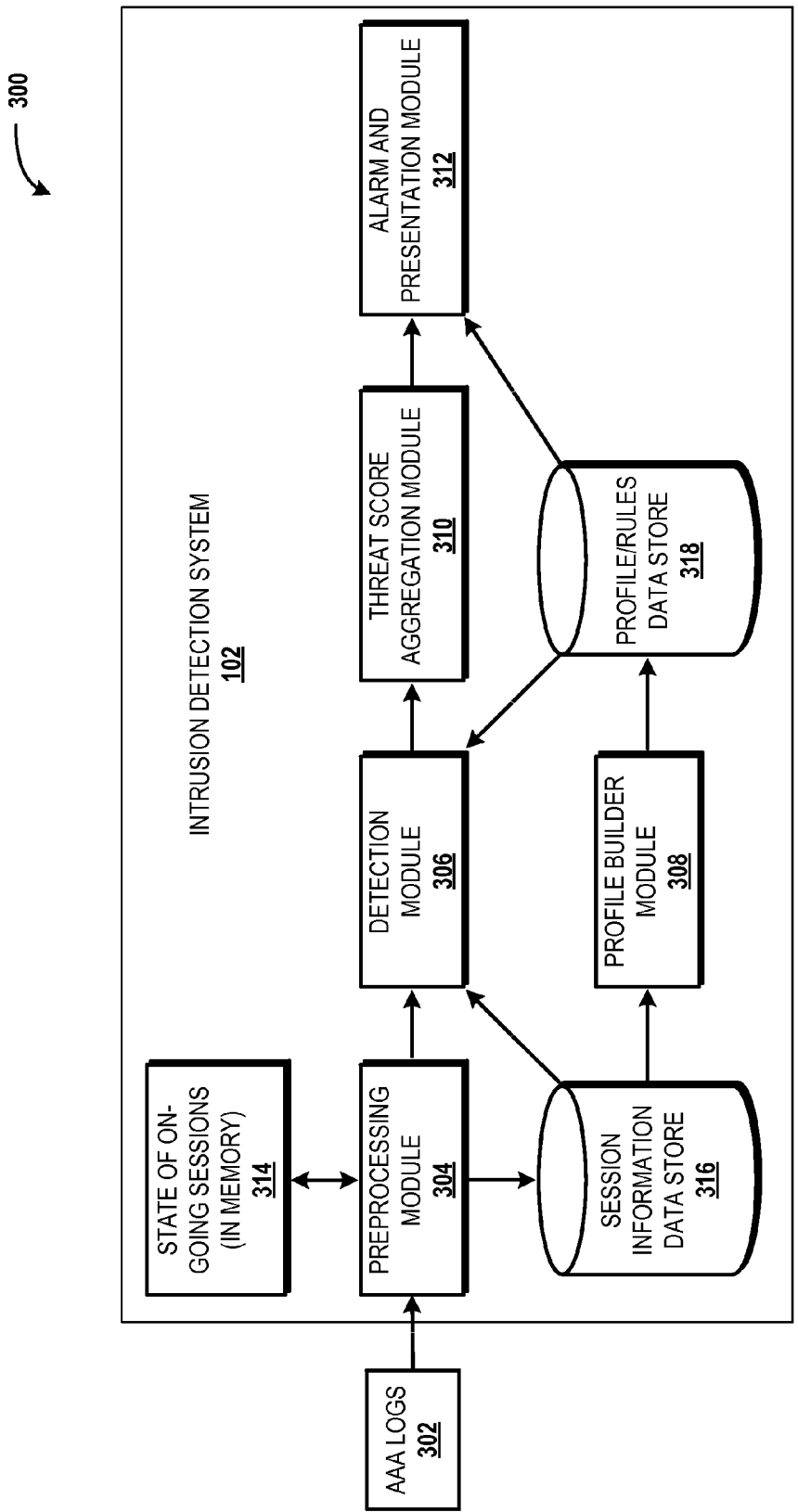
FIG. 3 is a diagram illustrating an architecture for an intrusion detection system, according to an illustrative embodiment.

Turning now to FIG. 3, an intrusion detection system architecture 300 will be described, according to an illustrative embodiment. The intrusion detection system architecture 300 includes the intrusion detection system 102 describe above with reference to FIG. 1. The intrusion detection system 102 is configured to receive one or more AAA logs 302 from the AAA system 106. The intrusion detection system 102 is also configured to execute a number of modules in order to perform various operations described herein. In the illustrated embodiment, the intrusion detection system 102 is configured to execute a preprocessing module 304, a detection module 306, a profile builder module 308, a threat score aggregation module 310, and an alarm and presentation module 312 to perform various operations described herein. The modules may execute on a single intrusion detection system 102 or in parallel across multiple intrusion detection systems 102. In addition, each module may consist of a number of subcomponents executing on intrusion detection systems or other computing systems or devices within, or in communication with, the intrusion detection system 102. Two or more of the illustrated modules may be combined. The modules may be implemented as software, hardware, or a combination thereof.

The preprocessing module 304 is configured to receive the AAA logs 302 and extract information from the AAA logs 302. The information can include a timestamp of an access request, an IP address of a targeted network device (e.g., loopback address), an IP address of a remote user device requesting access, a user's login ID, a command line executed, and/or other information such as user terminal, privilege level, and/or time zone. Although the preprocessing module 304 is described as receiving and extracting information from the AAA logs 302, it is contemplated that the preprocessing module 304 can receive and extract information from other logs in addition to or as an alternative to the AAA logs 302. As such, the embodiments in which the AAA logs 302 are used should not be interpreted as being limiting in any way.

The preprocessing module 304 is also configured to update, on an entry by entry basis, running states of on-going sessions 314 ("running states"), login IDs, origins, and commands to be utilized by one or more intrusion detection rules. The running states 314 can be stored in a session information data store 316. Periodically, (e.g., once a day) the running states 314 can be provided into the profile builder module 308. The profile builder module 308 is configured to update profiles utilized by intrusion detection rules. Initial profiles can be constructed via offline analysis of an extended period of historical data. Profiles and rules are stored in a profile/rules data store 318.

The detection module 306 is configured to examine the running states 314 and compare the running states 314 against the profiles and rules stored in the profile/rules data store 314 and tag the corresponding log entries with a threat score. The detection module 306 sends the threat scores to the threat score aggregation module 310. The threat score aggregation module 310 calculates the threat scores in a window according to the login ID or origin IP address. The alarm and presentation module 312 then makes the aggregated threat score information available to network security operators.

In some embodiments, the alarm and presentation module 312 can provide additional information associated with the login ID. For example, by looking up the login ID in a directory system, such as a corporate directory system, the intrusion detection system 102 can identify information such as the name, location, and/or job title of the offending user associated with the login ID. The alarm and presentation module 312 can present some or all of the additional information together with the aggregated threat score information and/or any associated alarm.

Figure 4:
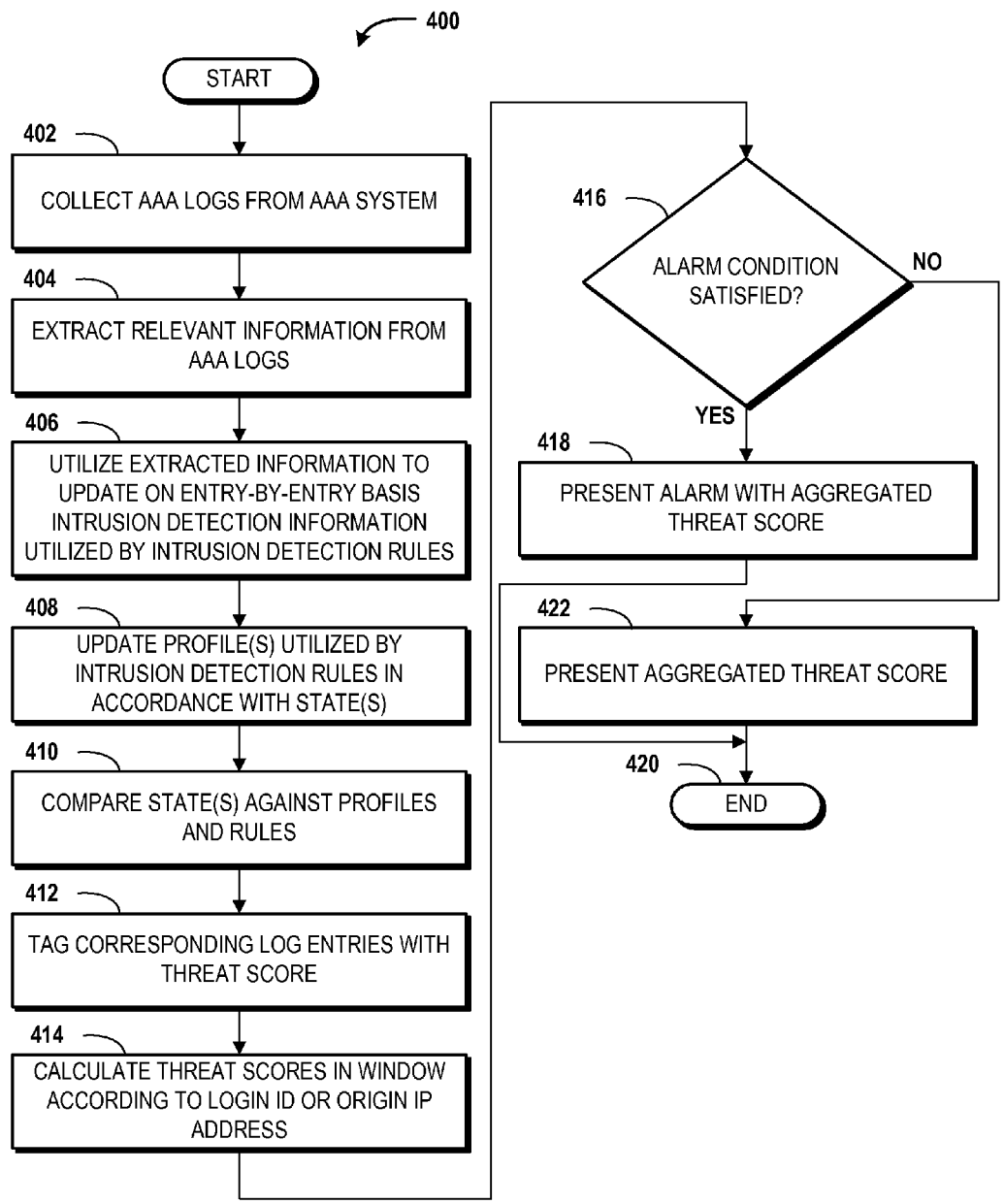
FIG. 4 is a flow diagram showing aspects of a method for monitoring operational activities within a network and detecting potential network intrusions and/or misuses, according to an illustrative embodiment.

Turning now to FIG. 4, a flow diagram showing aspects of a method 400 for monitoring operational activities within a network and detecting potential network intrusions and/or misuses will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multiprocessor systems, distributed computing systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 400 is described as being performed by the intrusion detection system 102, for example, by executing the various modules described herein above. The method 400 begins and proceeds to operation 402, wherein the intrusion detection system 102 collects one or more AAA logs from the AAA system 106. From operation 402, the method 400 proceeds to operation 404, wherein the intrusion detection system 102 extracts relevant information from the AAA logs. From operation 404, the method 400 proceeds to operation 406, wherein the intrusion detection system 102 utilizes the extracted information to update, on an entry-by-entry basis, intrusion detection information utilized by one or more intrusion detection rules.

From operation 406, the method 400 proceeds to operation 408, wherein the intrusion detection system 102 updates one or more profiles utilized by the intrusion detection rules. From operation 408, the method 400 proceeds to operation 410, wherein the intrusion detection system 102 compares the states against the profiles and rules. From operation 410, the method 400 proceeds to operation 412, wherein the intrusion detection system 102 tags corresponding log entries with a threat score. From operation 412, the method 400 proceeds to operation 414, wherein the intrusion detection system 102 calculates the threat score in a window according to a login ID or origin IP address to create an aggregated threat score. In some embodiments, at operation 414, in calculating the threat score, the intrusion detection system 102 sums the threat score.

From operation 414, the method 400 proceeds to operation 416, wherein the intrusion detection system 102 determines if an alarm condition is satisfied based upon the aggregated threat score. If the intrusion detection system 102 determines an alarm condition is satisfied based upon the aggregated threat score, the method 400 proceeds to operation 418, wherein the intrusion detection system 102 presents an alarm with the aggregated threat score. From operation 418, the method 400 proceeds to operation 420, wherein the method 400 may end. If the intrusion detection system 102 determines an alarm condition is not satisfied based upon the aggregated threat score, the method 400 proceeds to operation 422, wherein the intrusion detection system 102 presents the aggregated threat score. From operation 422, the method 400 proceeds to operation 420, wherein the method 400 may end.

Figure 5:
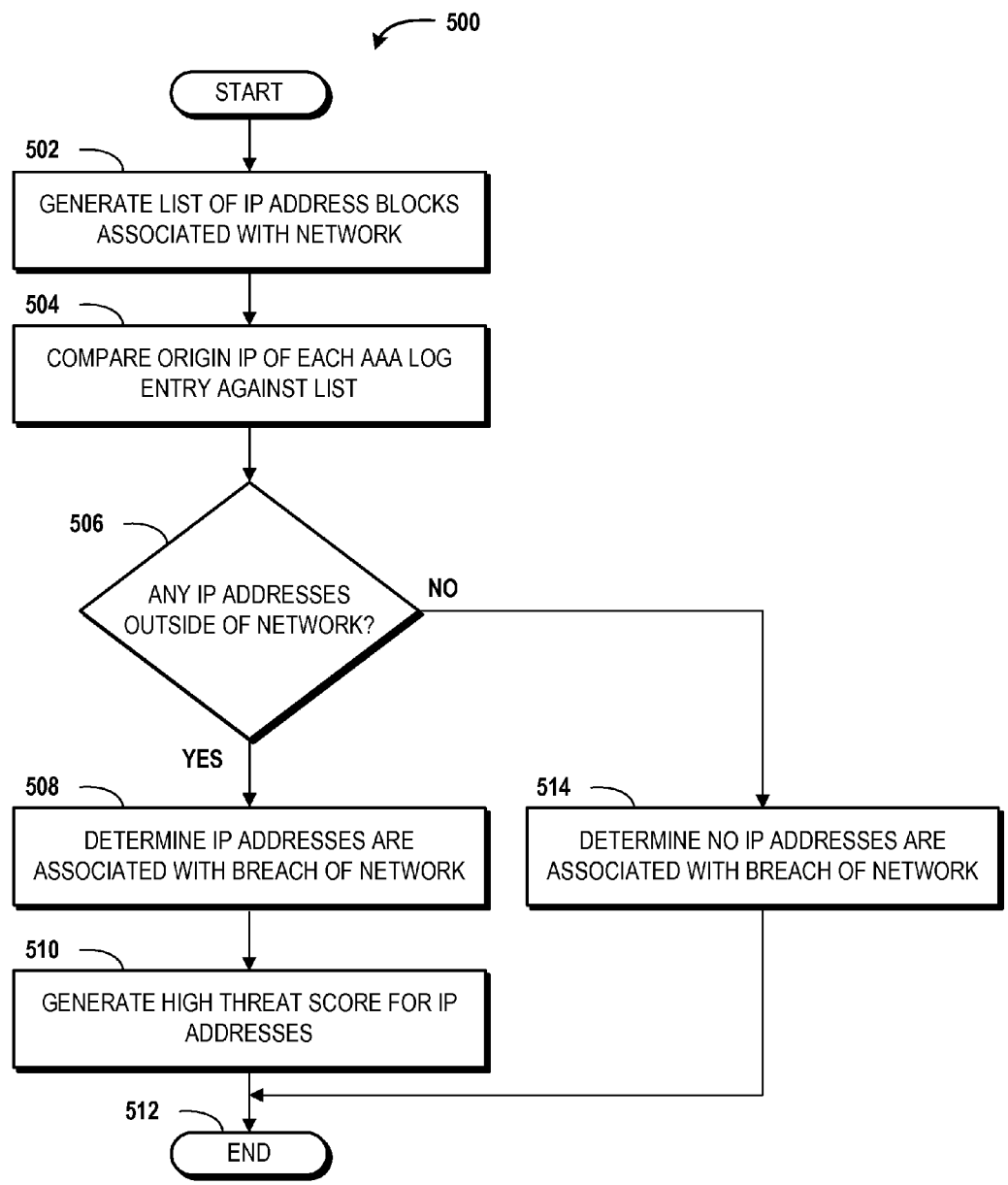
FIGS. 5-8 are flow diagrams showing aspects of methods for applying example domain knowledge-based rules, according to illustrative embodiments.

Turning now to FIG. 5, a method 500 for applying a domain knowledge-based rule will be described, according to an illustrative embodiment. The method 500 begins and proceeds to operation 502, wherein the intrusion detection system 102 generates a list of IP address blocks associated with a network, such as the network 104. From operation 502, the method 500 proceeds to operation 504, wherein the intrusion detection system 102 compares the origin IP address of each AAA log entry against the list of IP address blocks generated at operation 502.

From operation 504, the method 500 proceeds to operation 506, wherein the intrusion detection system 102 determines, based upon the comparison at operation 504, if any IP addresses are outside of the network. If the intrusion detection system 102 determines, at operation 506, that one or more IP addresses are outside of the network, the method 500 proceeds to operation 508, wherein the intrusion detection system 102 determines that the one or more IP addresses are associated with a breach of the network. From operation 508, the method 500 proceeds to operation 510, wherein the intrusion detection system 102 generates a high threat score for the one or more IP addresses. From operation 510, the method 500 proceeds to operation 512, wherein the method 500 may end. If the intrusion detection system 102 determines that no IP addresses are outside of the network, the method 500 proceeds to operation 514, wherein the intrusion detection system 102 determines that no IP addresses are associated with a breach of the network. From operation 514, the method 500 proceeds to operation 512, wherein the method 500 may end.

Turning now to FIG. 6, a method 600 for applying a domain knowledge-based rule will be described, according to an illustrative embodiment. The method 600 begins and proceeds to operation 602, wherein the intrusion detection system 102 detects a failed login attempt for an origin IP address. From operation 602, the method 600 proceeds to operation 604, wherein the intrusion detection system 102 tracks a timestamp of the failed login attempt. From operation 604, the method 600 proceeds to operation 606, wherein the intrusion detection system 102 monitors the origin IP address for subsequent login attempts within a timeout $T_1$.

From operation 606, the method 600 proceeds to operation 608, wherein the intrusion detection system 102 determines if a subsequent login attempt has been made within $T_1$. If the intrusion detection system 102 determines that a subsequent login attempt has not been detected, the method 600 proceeds to operation 610, wherein the intrusion detection system 102 resets the timestamp and a count of consecutive failed login attempts. From operation 610, the method 600 proceeds to operation 612, wherein the method 600 may end. If the intrusion detection system 102 detects a subsequent login attempt within $T_1$, the method 600 proceeds from operation 608 to operation 614. At operation 614, the intrusion detection system 102 determines if the subsequent login attempt was successful. If the intrusion detection system 102 determines that the subsequent login attempt was successful, the method 600 proceeds to operation 610, wherein the intrusion detection system 102 resets the timestamp and the count. From operation 610, the method 600 proceeds to operation 612, wherein the method 600 may end.

If the intrusion detection system 102 determines that the subsequent login attempt was not successful, the method 600 proceeds to operation 616, wherein the intrusion detection system 102 updates the timestamp to reflect a new failed login attempt. From operation 616, the method 600 proceeds to operation 618, wherein intrusion detection system 102 increments the count of consecutive failed login attempts for the origin IP address. From operation 618, the method 600 proceeds to operation 620, wherein the intrusion detection system 102 determines if the count exceeds a count threshold $N_1$. If the intrusion detection system 102 determines that the count does not exceed the count threshold $N_1$, the method 600 returns to operation 602, wherein the intrusion detection system 102 can detect another failed login attempt. If the intrusion detection system 102 determines that the count does exceed the count threshold $N_1$, the method 600 proceeds to operation 622, wherein the intrusion detection system 102 outputs the entries associated with the failed login attempts. From operation 622, the method 600 proceeds to operation 624, wherein the intrusion detection system 102 assigns a threat score to each entry. From operation 624, the method 600 proceeds to operation 612, wherein the method 600 may end.

Turning now to FIG. 7, a method 700 for applying a domain knowledge-based rule will be described, according to an illustrative embodiment. The method 700 begins and proceeds to operation 702, wherein the intrusion detection system 102 traces stepping-stone accesses. From operation 702, the method 700 proceeds to operation 704, wherein the intrusion detection system 102 determines if the length of an access chain is greater than a threshold $N_2$, or if the fan out is greater than a threshold $N_3$. If the intrusion detection system 102 determines that the length of the access chain is greater than the threshold $N_2$ or that the fan out is greater than the threshold $N_3$, the method 700 proceeds to operation 706, wherein the intrusion detection system 700 assigns a threat score to the stepping-stone session. From operation 706, the method 700 proceeds to operation 708, wherein the method 700 may end. If the intrusion detection system 102 determines that the length of the access change is not greater than the threshold $N_2$ or that the fan out is not greater than the threshold $N_3$, the method 700 proceeds to operation 708, wherein the method 700 may end.

Figure 8:
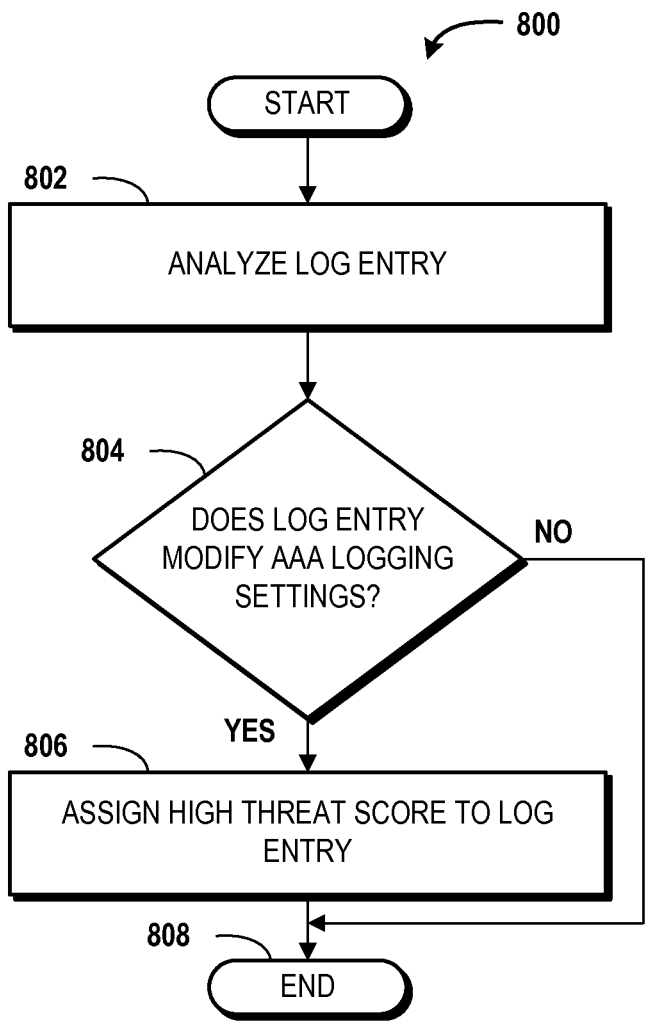

Turning now to FIG. 8, a method 800 for applying a domain knowledge-based rule will be described, according to an illustrative embodiment. The method 800 begins and proceeds to operation 802, wherein the intrusion detection system 102 analyzes a log entry. From operation 802, the method 800 proceeds to operation 804, wherein the intrusion detection system 102 determines if the log entry modifies any AAA logging settings. If the intrusion detection system 102 determines that the log entry modifies any AAA logging settings, the method 800 proceeds to operation 806, wherein the intrusion detection system 102 assigns a high threat score to the log entry. From operation 806, the method 800 proceeds to operation 808, wherein the method 800 may end. If the intrusion detection system 102 determines that the log entry does not modify any AAA logging settings, then the method 800 proceeds to operation 808, wherein the method 800 may end.

Figure 9:
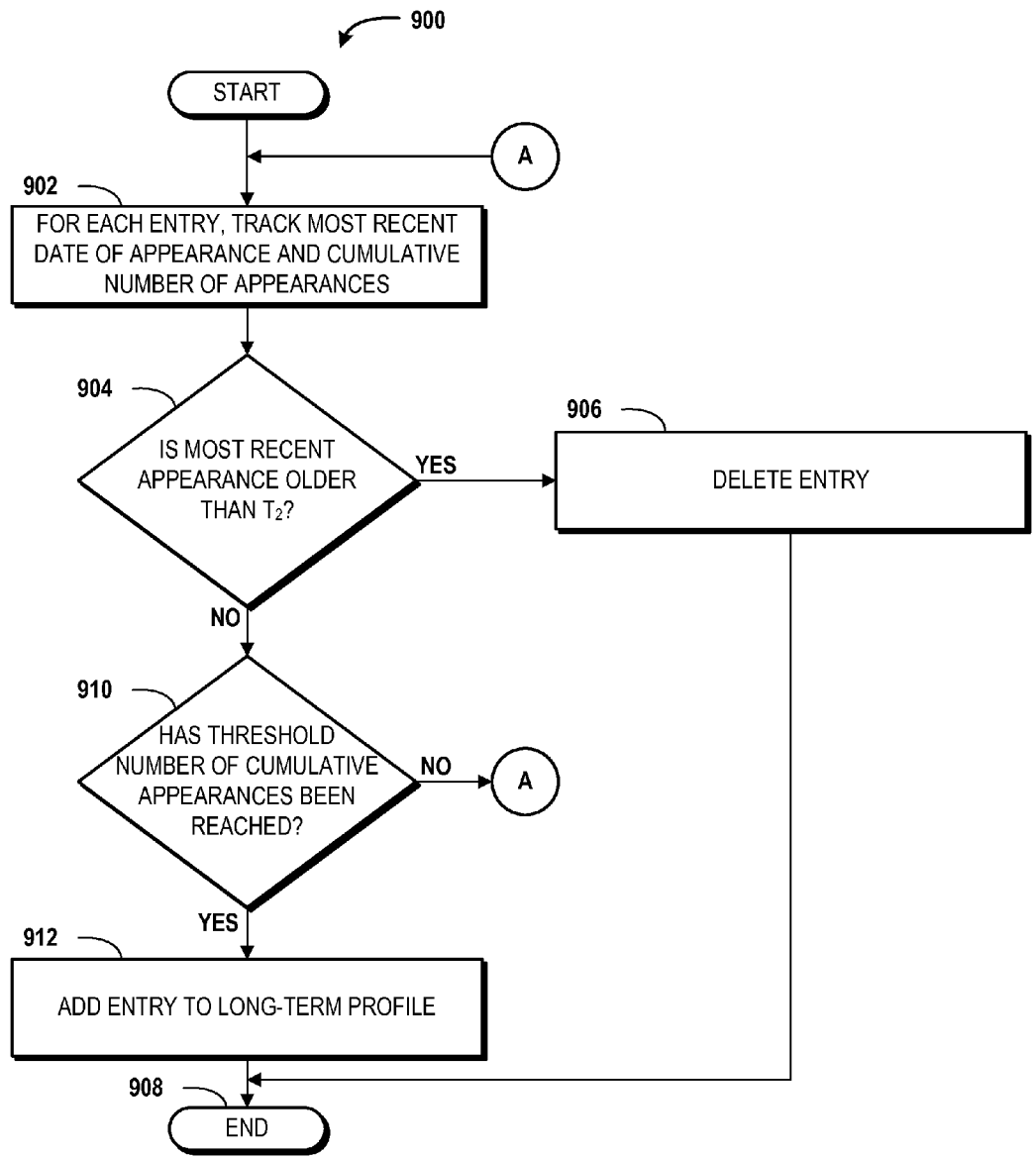
FIG. 9 is a flow diagram showing aspects of a method for applying an example rule based upon an access pattern profile, according to an illustrative embodiment.

Turning now to FIG. 9, a method 900 for applying a rule based upon an access pattern profile will be described, according to an illustrative embodiment. The method 900 begins and proceeds to operation 902, wherein, for each entry in a given AAA log, the intrusion detection system 102 tracks the most recent date of appearance and the cumulative number of appearances. From operation 902, the method 900 proceeds to operation 904, wherein the intrusion detection system 102 determines if the most recent appearance is older than $T_2$. If the intrusion detection system 102 determines that the most recent appearance is older than $T_2$, the method 900 proceeds to operation 906, wherein the intrusion detection system 102 deletes the entry. From operation 906, the method 900 proceeds to operation 908, wherein the method 900 may end. If the intrusion detection system 102 determines that the most recent appearance is not older than $T_2$, the method 900 proceeds to operation 910.

At operation 910, the intrusion detection system 102 determines if a threshold number of cumulative appearances has been reached. If the intrusion detection system 102 determines that a threshold number of cumulative appearances has not been reached, the method 900 returns to operation 902. If the intrusion detection system 102 determines that a threshold number of cumulative appearances has been reached, the method 900 proceeds to operation 912, wherein the intrusion detection system 102 adds the entry to a long-term profile. The method 900 then proceeds to operation 908, wherein the method 900 may end.

Figure 10:
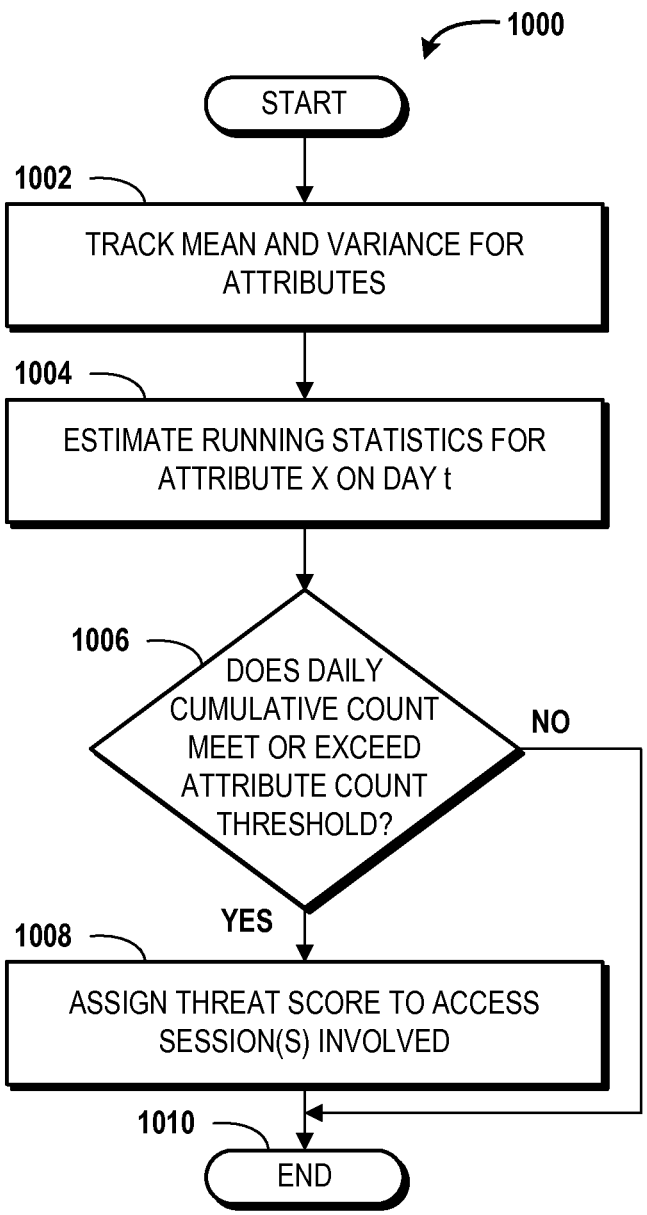
FIG. 10 is a flow diagram showing aspects of a method for applying an example rule based upon a statistical model of an access profile, according to an illustrative embodiment.

Turning now to FIG. 10, a method 1000 for applying a statistical model-based rule will be described, according to an illustrative embodiment. The method 1000 begins and proceeds to operation 1002, wherein the intrusion detection system 102 tracks a mean and a variance for one or more attributes. From operation 1002, the method 1000 proceeds to operation 104, wherein the intrusion detection system 102 estimates running statistics for an attribute X on day t. From operation 1004, the method 1000 proceeds to operation 1006, wherein the intrusion detection system 102 determines if the daily cumulative count meets or exceeds an attribute count threshold. If the intrusion detection system 102 determines that the daily cumulative count meets or exceeds the attribute count threshold, the intrusion detection system 102 assign a threat score to one or more access sessions involved. From operation 1008, the method 1000 proceeds to operation 1010, wherein the method 1000 may end. If the intrusion detection system 102 determines that the daily cumulative count does not meet or exceed the attribute count threshold, the method 1000 proceeds to operation 1010, wherein the method 1000 may end.

The following description includes an evaluation of the intrusion detection system 102 implementing the above-described rules. The intrusion detection system 102 is evaluated from two perspectives—the rate of anomalies detected from day-to-day network management activities and the effectiveness of detecting artificially injected anomalous activities. The former quantifies the resources required to investigate potential misuses and intrusions. The latter quantifies the chance that an anomaly goes undetected by the intrusion detection system 102. The evaluation of the intrusion detection system 102 described herein below is based in part upon the network under study. It should be understood that network variables particular to a given network under study may result in performance of the intrusion detection system 102 utilizing the above-described rules being greater than or less than the performance described herein. As such, the details of the following evaluation should be interpreted as being merely illustrative, and should not be considered limiting in any way.

Figure 11A:
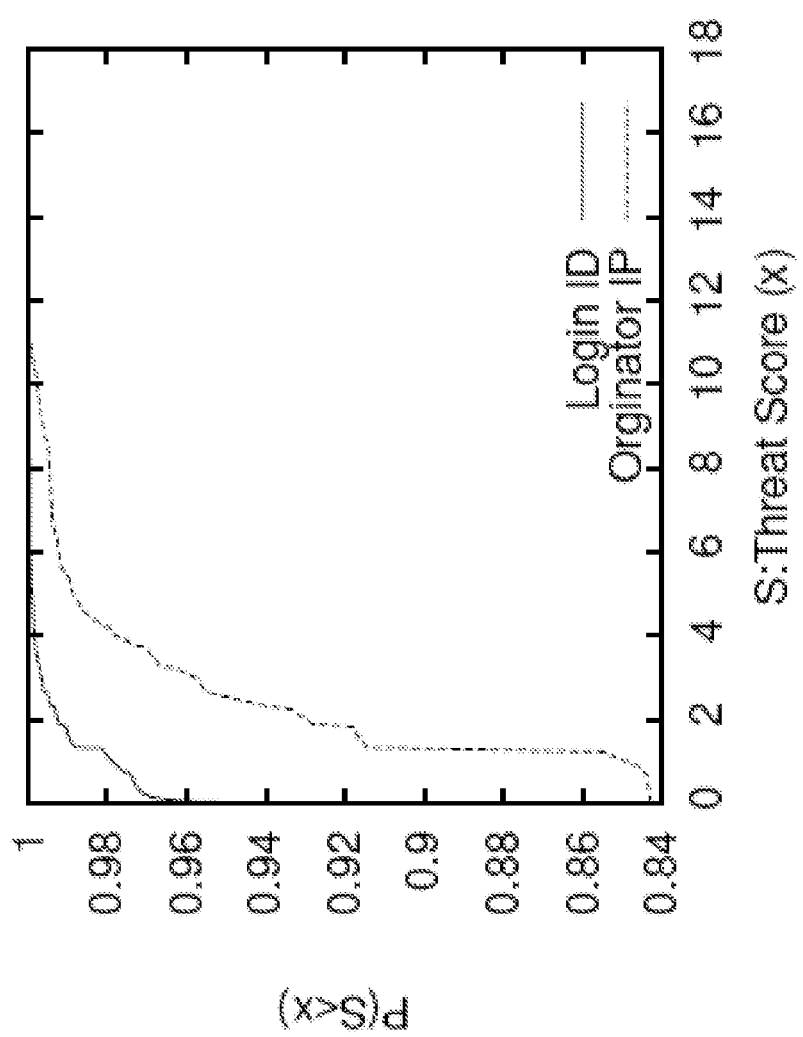
FIG. 11A-11I are graphs showing results of an evaluation of an intrusion detection system described herein.

FIG. 11A shows the distribution of an example aggregate threat score in a month using two types of aggregations—by login ID (solid line) and by origin IP address (dashed line). It can be observed from FIG. 11A that about 93% of origin IPs pass the intrusion detection system 102 without raising any threat score. Meanwhile, the intrusion detection system 102 reports a high threat score for a small number of origin IPs. By manual inspection, it is revealed that most of the reports of a high threat score correspond to unusual network changes such as a newly deployed network management center or a major software upgrade on an existing network management tool. It is also revealed that a non-negligible fraction of cases, mostly with a relatively low threat score (e.g., less than 4), correspond to a small number of log entries from either a newly enabled or a very infrequently used account. Profiles for such accounts can be difficult to construct based upon history, and such profiles typically do not generate many activities that yield a high threat score. An embodiment in which a system enhancement is applied to the intrusion detection system 102 to further reduce the false alarms due to new user accounts is described herein below.

FIG. 11A defines the tradeoff curves between the alarming rate and the sensitivity to anomalous activities. Raising the alarm threshold reduces the number of cases that security operators have to investigate but also reduces the chance of catching a stealthy intrusion. As a concrete example, setting the alarm threshold to 5 could produce a few alarms per week on average, which should be manageable for the network security operators.

Figure 11B:
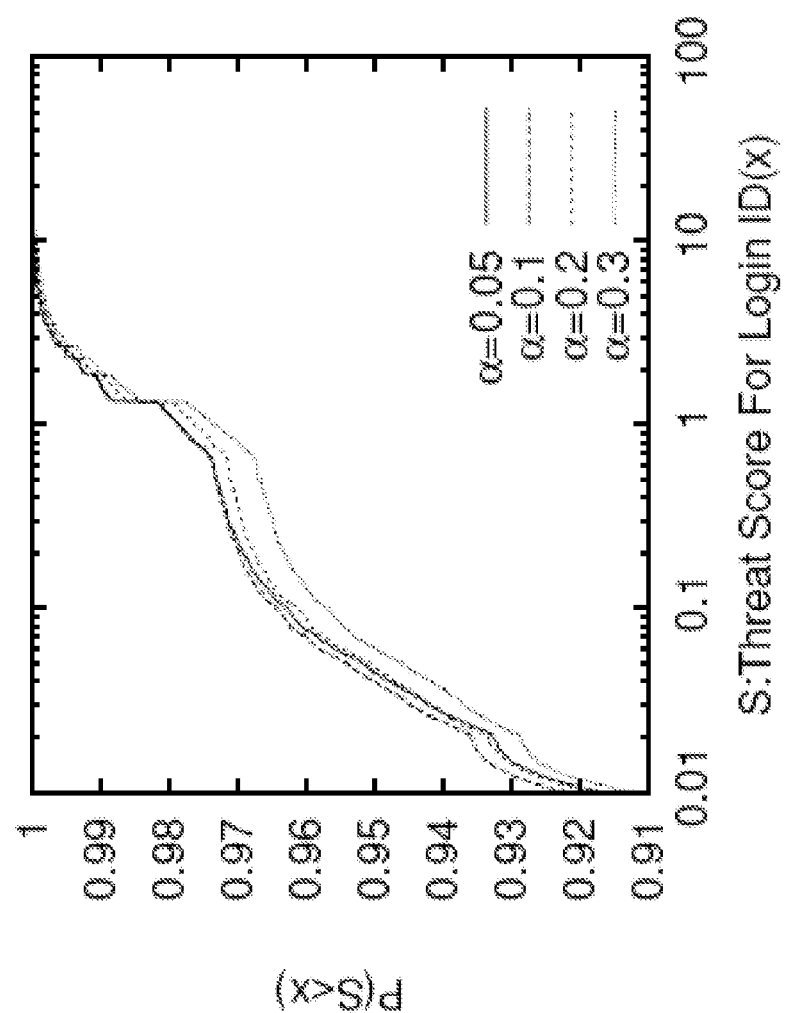

FIG. 11B shows the solid line of FIG. 11A with a varying a value used in the exponentially weighted moving average ("EWMA") estimate. Note the x-axis is in log scale. Different $\alpha$ values effectively factor in different amounts of history data. Setting $\alpha$=0.05 effectively ignores (e.g., weight less than 0.01) data more than 90 active days old while $\alpha$=0.3 effectively ignores data more than 13 active days old. However, FIG. 11B shows there is little different in the threat scores among the four different α values—indicating that a short history may be sufficient for the intrusion detection system 102.

Due to the lack of real attacks observed in a network, a set of data with anomalies was generated for the performance test. Using FIG. 11A as a reference point, the design of a controlled experiment to test the intrusion detection system 102 is as follows. First, 50 pairs of non-overlapping login IDs are randomly selected. Next, AAA logs from one day of running the intrusion detection system 102 are considered and the login ID field in each of the log entries is substituted such that the two login IDs in each of the chosen pairs are switched. Finally, the manipulated AAA logs are fed into the intrusion detection system 102 and the output of the intrusion detection system 102 is monitored.

Figure 11C:
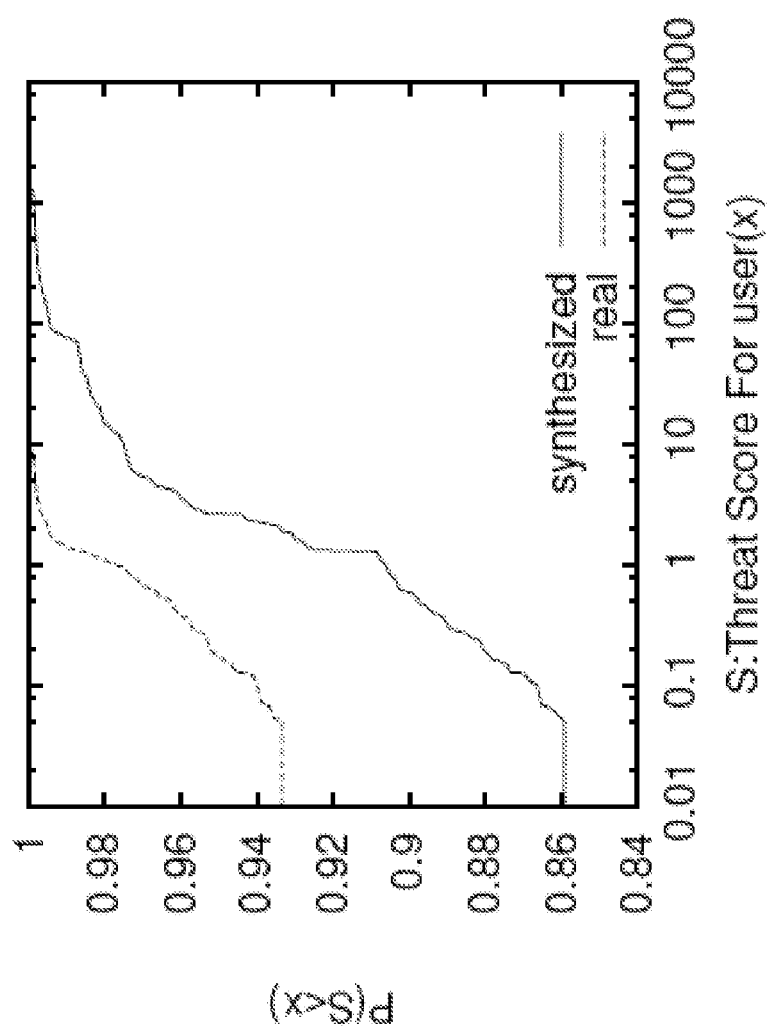

FIG. 11C shows the CDF curves of an example aggregate threat score based upon the original AAA logs (shown by the dashed line in FIG. 11C) and the synthetic data (shown by the solid line in FIG. 11C), respectively. The intrusion detection system 102 is able to detect many of the behavior changes introduced by login ID swapping. It can be observed from FIG. 11C that 72 out of the 100 login IDs report non-zero threat score and, among the login IDs, 30 login IDs have a threat score higher than 10. This result highlights the sensitivity of the intrusion detection system 102. It is not expected that one user impersonating another user can always be caught (e.g., two operators with the same role may hardly be distinguishable), but compared to the baseline threat score distribution under normal operation, the synthetically generated ID-swapping stand out significantly.

Figure 11D:
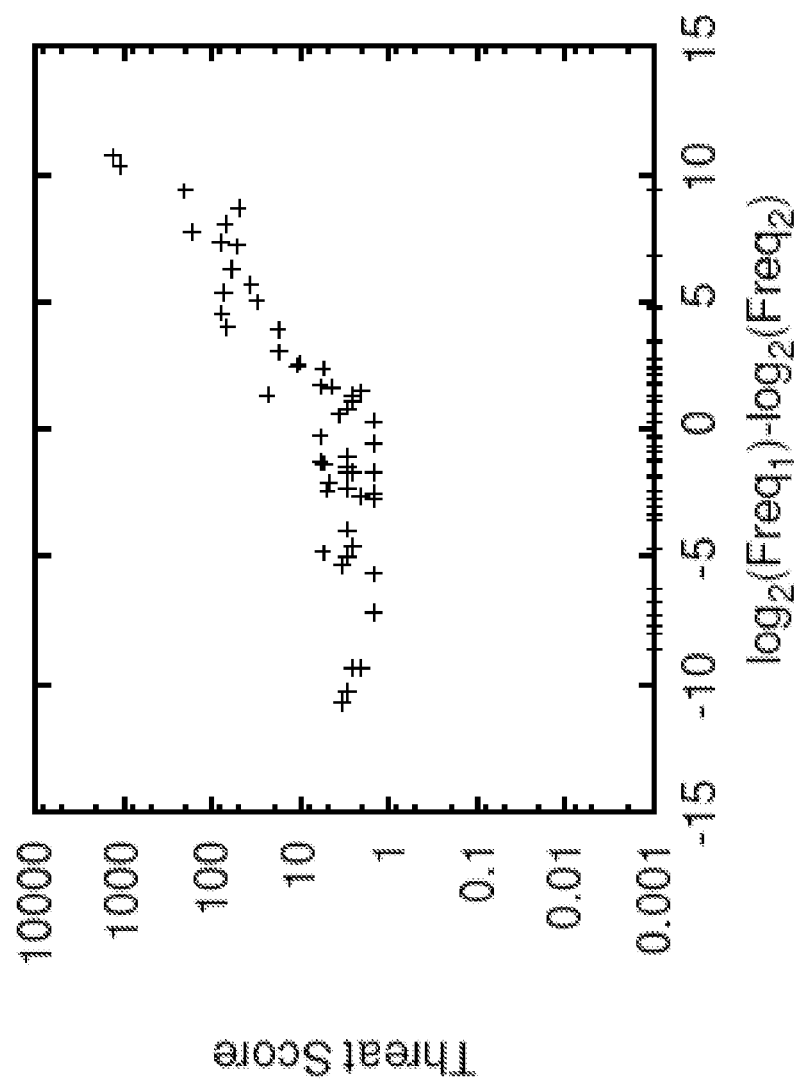
Figure 11E:
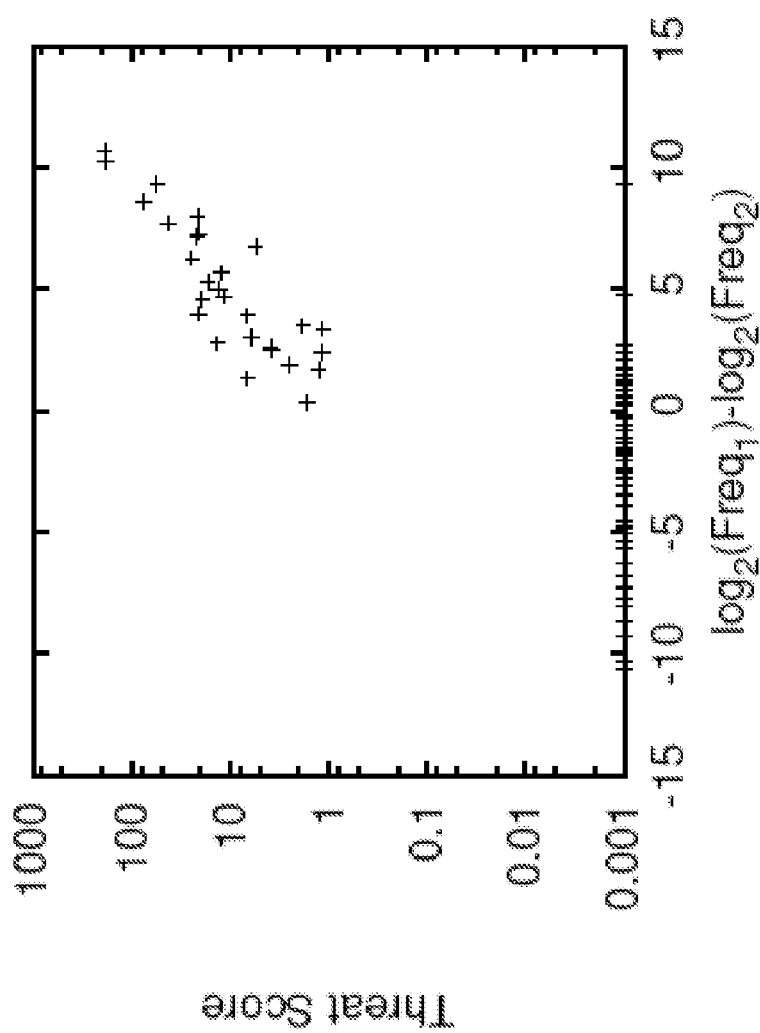

FIGS. 11D and 11E provide a closer view of how the intrusion detection system 102 can detect anomalous behaviors. FIGS. 11D and 11E compare the contribution to the threat score from rules based on access pattern profiles with the contribution from rules based upon statistical models of the access profile, respectively. The threat score for each of the 100 login IDs are plotted against the difference in the daily average access frequency to the substituting login ID in the AAA logs. For example, a login ID abc, with 16 sessions per day on average, which is replaced by login xyz, with an average of 1024 sessions per day, would have a threat score plotted at 6 (i.e., log(1024)-log(16)) on the x-axis. It can be observed from FIGS. 11D and 11E that both the access pattern changes and the access statistics changes have contributed to the high threat score. The higher the difference in the amount of access activities between the pair of swapped login IDs, the higher the resulting threat scores—with the exception shown in FIG. 11E on the negative side of the x-axis. The exception arises because the rules based upon the statistical models are one-sided. That is, alerts are not provided, for example, when a "busy" user suddenly becomes less active, as such behavior does not appear to pose any security threat.

Figure 11F:
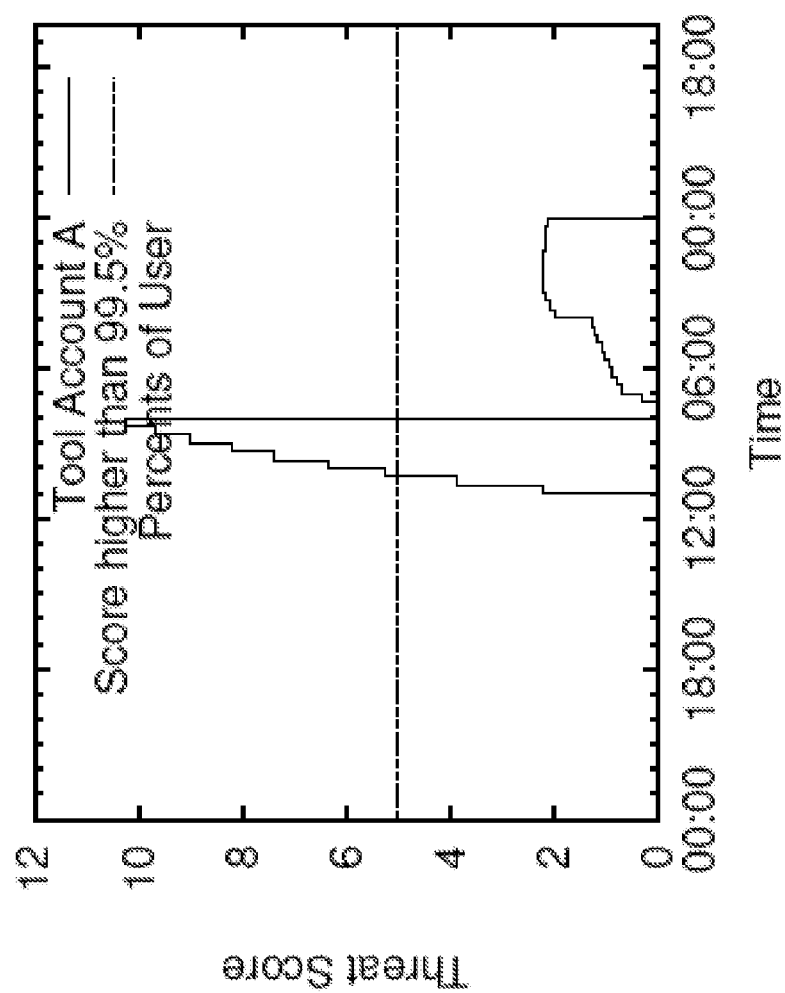

Turning now to FIG. 11F, an example in which the intrusion detection system 102 alerts with a high threat score. FIG. 11F shows a plot of an example aggregate threat score of a particular login ID over the course of four days. The login ID is used by a software tool that periodically initiates ping commands among various provider edge ("PE") routers of virtual private network ("VPN") customers to monitor VPN health.

A fast increase in the threat score by the login ID starting in the afternoon of day 2 can be observed in the plot shown in FIG. 11F. In less than two hours, the threat score passed the 99.5% alarming threshold and continued to rise. The cause of the high threat score was determined to be that the software tool was upgraded that day and the new control sessions included a show version command that collects the router OS version across the network—similar to what might occur if an intruder attempted to collect information as preparation for attacks. After validating the change of behavior due to the software upgrade, the pattern change was included the profile update at the end of the day, which greatly reduced the threat score on day 3. The corresponding statistical models were further updated at the end of day 3 to fully capture the new pattern. As a result, there was no more threat score on day 4.

The following example explains an instance in which a system alert was triggered due to a new user appearing to the intrusion detection system 102. In this example, a new operator X started a session to a device between 1:30 and 1:59; since this was a newly created login ID, bearing no historical association to either the network zone or the origin IP, the session produced a threat score of 1.5 at the end of the session. Later in the day, operator X logged on to four more devices in the same network zone between 3:20 and 3:40 in 21 different login sessions, pushing the threat score to 7.7 and triggering an alarm. A network security manager examined the alarm and checked X's information from a corporate directory service. The threat was quickly dismissed when it was learned that operator X was a new member of the organization that manages the network zone in question. The operational experience acquired in such scenarios is described below in regard to how the intrusion detection system 102 can be enhanced specifically for newly provisioned login IDs.

Operational experience with the intrusion detection system 102 has provided a valuable insight—when investigating a threat alert regarding a user login, network security officers often depend on the user's information in the corporate directory in addition to the access traces and profiles from the intrusion detection system 102. Accordingly, the following description provided an embodiment of the intrusion detection system 102 in which corporate directory information is utilized to further reduce false threat alarms.

The intrusion detection system 102 can be modified with an automation capability that queries a corporate directory service for any given login ID. In particular, the intrusion detection system 102 can obtain the corporate hierarchy information of the owner of the login ID by following the management chain up until reaching the president of the ISP or other network under study. The intrusion detection system 102 then examines how users across the corporate hierarchy relate in terms of network access patterns and behaviors.

Figure 11G:
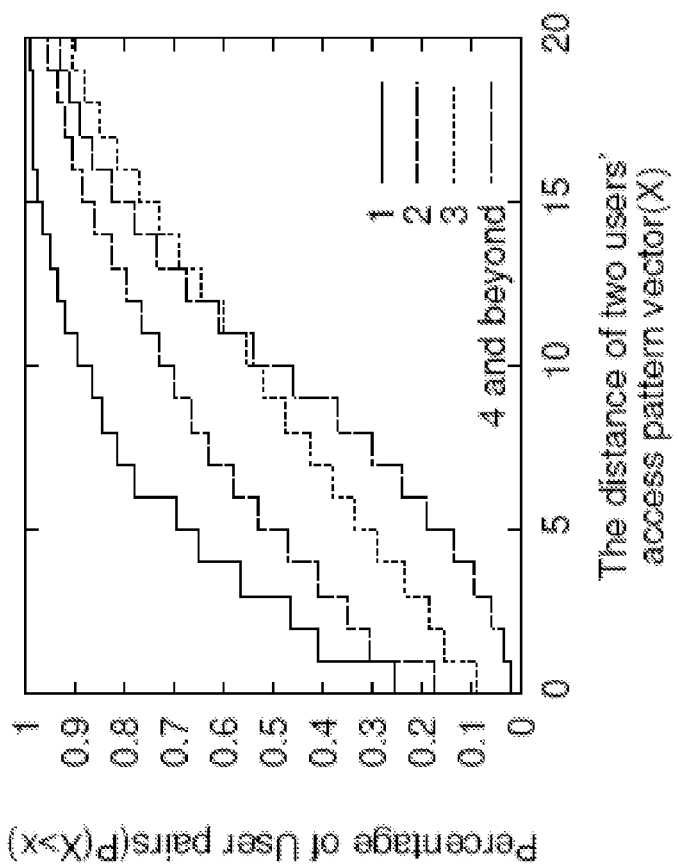

FIG. 11G shows a plot of the CDF of an example profile distance with respect to the access patterns—measured by the $l^2$ norm of the difference in the profile vector between a pair of user login IDs. The corporate distance of a pair of users is defined as the maximum number of hops for the users to reach a common manager. For example, two operators sharing the same direct supervisor would have a corporate distance of 1, and two sharing the same second-level-up manager would have a corporate distance of 2, and so on. Different lines in FIG. 11G correspond to user pairs of different corporate distances.

Users that are organizationally close often have similar access profiles. The further apart two users are in corporate distance, the more distinct the access patterns are for the users. If two operators are under the same direct manager (solid line), it can be observed that in 26% of the cases the two operators have identical access patterns; and in 56% of the cases, the difference among the access patterns is no more than 3 (e.g., having access to 3 different network zones). This suggests that using the profiles of other team members can serve as a reasonable approximation when the operator's own history is not fully established.

Figure 11H:
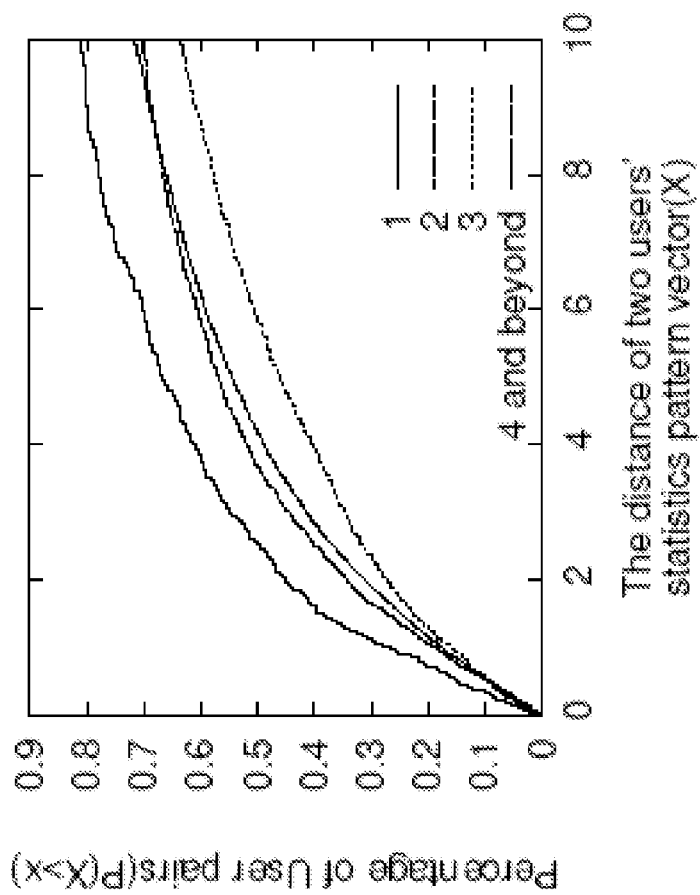
Figure 11I:
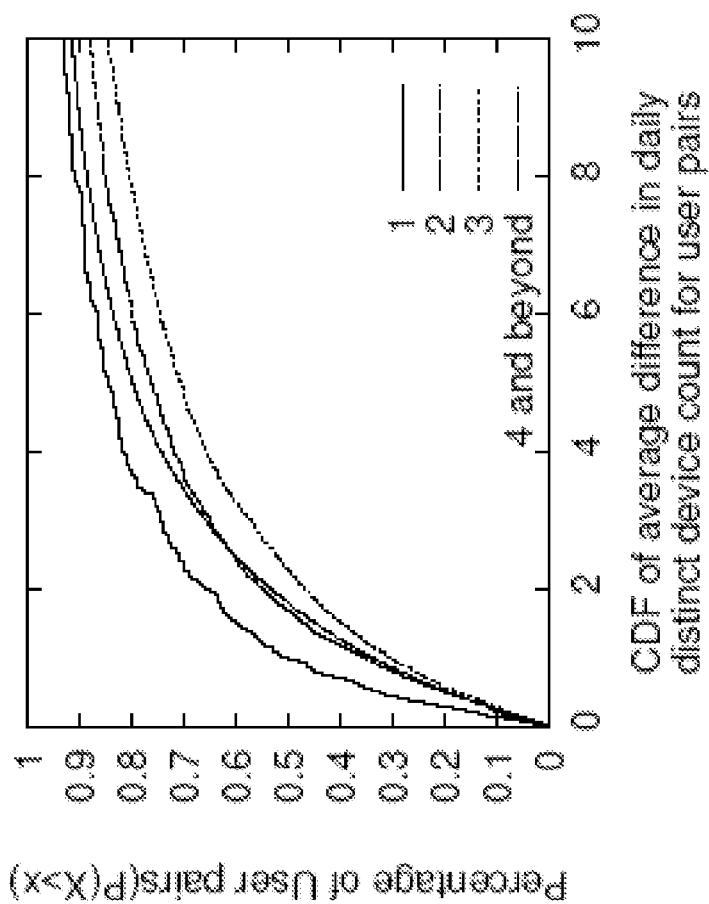

FIGS. 11H and 11I show plots of the CDF of an example absolute difference in the daily average number of sessions and the daily average number of distinct devices accessed, respectively. In both cases, it can be observed that decreasing trends in the behavioral similarity as users' corporate distances increase, although the gaps are smaller compared to FIG. 11G. Focusing on the solid lines, it can be observed that in 65% of the cases when users have a common direct reporting manager, the daily average number of sessions exercised differs by no more than 5 and the daily average number of distinct devices accessed differs by no more than 2. A similar commonality can be observed in the profile of command token frequencies. These observations point to the potential of bootstrapping profile building for newly provisioned login IDs using the profiles of a new user's peers.

As described above in the operational case examples, network security managers may dismiss system generated threats based upon the additional information regarding the job function of the operator. If domain knowledge of all different job functions and the expected access profiles were available, this information could be incorporated into the intrusion detection system 102. However, such domain knowledge is implicit, highly distributed across the various organizations, and evolving over time. Thus, it is operationally challenging to acquire and maintain such information. Instead, a data-driven approach that does not require domain knowledge input is presented below.

Specifically, user login IDs are organized into classes based upon the login owner's management hierarchy, and class-profiles based upon the profiles of the members of the class are created. When a new login ID appears in the AAA log, the intrusion detection system 102 queries the corporate directory service to obtain the user class to which the new login ID belongs. The class profile is then used as the bootstrapping profile for the user. The bootstrapping profile is replaced by the user's own profile after adequate history has been observed for the login ID.

To construct the class-profiles, the intrusion detection system 102 can take the median statistic on each dimension (i.e., a feature in the profile of login ID) among all users (u) belonging to the class (C). Specifically, $$PROFILE^C = \{ f_1^C, f_2^C, \ldots \}, \text{ where } f_1^C = \text{median}_{u \in C} f_i^u.$$

This is applicable to both binary flags (e.g., whether a login ID and network zone association exists) or numerical values (e.g., average number of sessions per day). Using the median is known to produce an estimator of cluster centroid that is robust to outliers.

Comparing the alert rate with and without profile bootstrapping, for the same month of data described above, it can be observed that bootstrapping can reduce the threat alerts (using a threshold $N_6=5$) by 60% for login IDs with inadequate history (i.e., less than or equal to seven active days of history). The overall threat alert rate for all login IDs is consequently reduced by 17% with profile bootstrapping.

Figure 12:
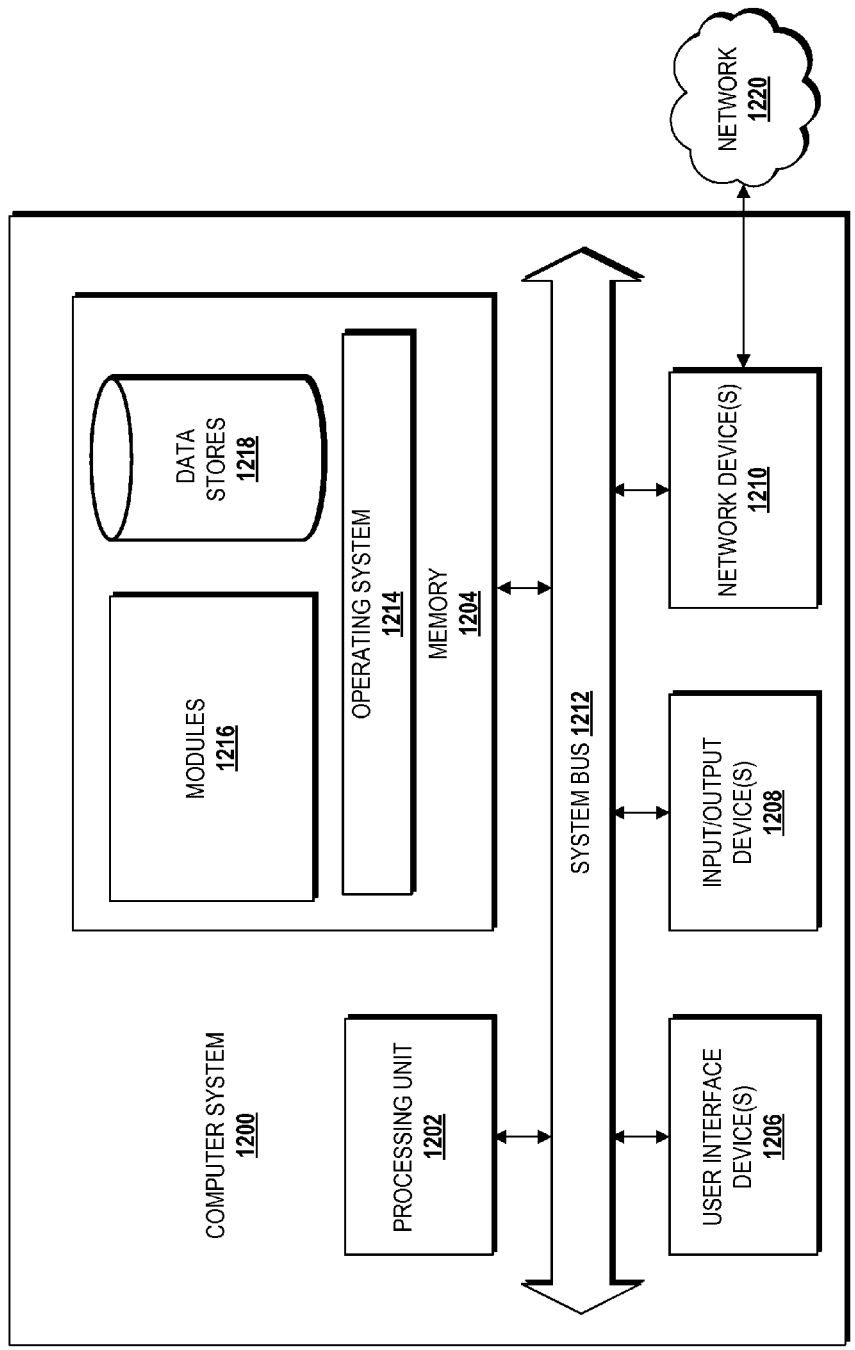
FIG. 12 is a computer architecture diagram illustrating an illustrative computer hardware and software architecture for a computing system capable of implementing aspects of the embodiments presented herein.

FIG. 12 is a block diagram illustrating a computer system 1200 configured to perform various operations disclosed herein. The computer system 1200 includes a processing unit 1202, a memory 1204, one or more user interface devices 1206, one or more input/output ("I/O") devices 1208, and one or more network devices 1210, each of which is operatively connected to a system bus 1212. The bus 1212 enables bi-directional communication between the processing unit 1202, the memory 1204, the user interface devices 1206, the I/O devices 1208, and the network devices 1210. In some embodiments, the intrusion detection system 102 is configured like the computer system 1200. It should be understood, however, that the intrusion detection system 102 may include additional functionality or include less functionality than now described.

The processing unit 1202 may be a standard central processor that performs arithmetic and logical operations, a more specific purpose programmable logic controller ("PLC"), a programmable gate array, or other type of processor known to those skilled in the art and suitable for controlling the operation of the computer system 1200. Processing units are generally known, and therefore are not described in further detail herein.

The memory 1204 communicates with the processing unit 1202 via the system bus 1212. In some embodiments, the memory 1204 is operatively connected to a memory controller (not shown) that enables communication with the processing unit 1202 via the system bus 1212. The illustrated memory 1204 includes an operating system 1214, one or more modules 1216, and one or more data stores 1218.

The operating system 1214 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The modules 1216 can include computer-executable instructions that, when executed by the processing unit 1202, cause the computer system 1200 to perform operations such as those described herein above with reference to methods set forth in FIGS. 4-10. The modules 1216 may include the preprocessing module 304, the detection module 306, the profile builder module 308, the threat score aggregation module 310, and/or the alarm and presentation module 312. The data stores 1218 may include the session information data store 316 and/or the profiles/rules data store 318.

The user interface devices 1206 may include one or more devices with which a user accesses the computer system 1200. The user interface devices 1206 may include, but are not limited to, computers, servers, personal digital assistants, telephones (e.g., cellular, IP, or landline), or any suitable computing devices. The I/O devices 1208 enable a user to interface with the program modules. In one embodiment, the I/O devices 1208 are operatively connected to an I/O controller (not shown) that enables communication with the processing unit 1202 via the system bus 1212. The I/O devices 1208 may include one or more input devices, such as, but not limited to, a keyboard, a mouse, or an electronic stylus. Further, the I/O devices 1208 may include one or more output devices, such as, but not limited to, a display screen or a printer.

The network devices 1210 enable the computer system 1200 to communicate with other networks or remote systems via a network 1220, such as the network 104 illustrated and described with reference to FIG. 1 and/or other network(s). Examples of the network devices 1210 include, but are not limited to, a modem, a radio frequency ("RF") or infrared ("IR") transceiver, a telephonic interface, a bridge, a router, or a network card. The network 1220 may include a wireless network such as, but not limited to, a WLAN such as a WI-FI network, a WWAN, a wireless PAN ("WPAN") such as BLUETOOTH, or a wireless MAN ("WMAN"). Alternatively, the network 1220 may be a wired network such as, but not limited to, a WAN such as the Internet, a LAN such as the Ethernet, a wired PAN, or a wired MAN.

The network 1220 embodied as a cellular network may utilize a mobile telecommunications technology such as, but not limited to, Global System for Mobile communications ("GSM"), Universal Mobile Telecommunications System ("UMTS"), Code Division Multiple Access ("CDMA") ONE, CDMA2000, Long-Term Evolution ("LTE"), and various other 2G, 2.5G, 3G, 4G, and greater generation mobile telecommunications technologies. In addition, mobile data communications technologies such as General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), and various other current and future mobile data communications technologies are contemplated for use by the network 1220. Therefore, the embodiments presented herein should not be construed as being limiting to a particular mobile telecommunications technology and/or standards utilizing such technologies.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer system 1200. For purposes of the claims, the phrase "computer-readable storage medium" and variations thereof, does not include waves, signals, and/or other transitory and/or intangible communication media, per se. In an illustrative embodiment, a computer-readable storage medium is a tangible computer-readable storage medium.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer system 1200 in order to store and execute the software components presented herein. It is also contemplated that the computer system 1200 may not include all of the components shown in FIG. 12, may include other components that are not explicitly shown in FIG. 12, or may utilize an architecture completely different than that shown in FIG. 12.

Based on the foregoing, it should be appreciated that concepts and technologies for monitoring operational activities in networks and detecting potential network intrusions and misuses have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims. As used herein, "cause a processor to perform operations" includes causing a processor of a computing system or device to perform one or more operations of the operations and/or causing the processor to direct other components of the computing system or device to perform one or more of the operations.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:
1. A method, comprising:
    collecting, by an intrusion detection system comprising a processor, logs from an authentication, authorization, and accounting logs data store, wherein each of the logs comprises a plurality of entries corresponding with a networking device;
    extracting, by the intrusion detection system, information from the logs;
    based upon the information extracted from the logs, updating, by the intrusion detection system, on an entry-by-entry basis, intrusion detection information utilized by an intrusion detection rule, wherein the intrusion detection rule comprises
        tracing stepping-stone accesses,
        determining if a length of an access chain is greater than a threshold length, the threshold length identifying a maximum number of routers considered to correspond with normal operational activities,
determining if a fan out of the access chain is greater than a fan out threshold,
if the length of the access chain is greater than the threshold length, assigning a high threat score to a stepping-stone session corresponding with the stepping-stone accesses, and
if the fan out of the access chain is greater than the fan out threshold, assigning a high threat score to a stepping-stone session corresponding with the stepping-stone accesses;
updating, by the intrusion detection system, a profile utilized by the intrusion detection rule;
comparing, by the intrusion detection system, the profile and the intrusion detection rule against a running state of an on-going session;
tagging, by the intrusion detection system, corresponding log entries of the logs with a threat score;
calculating, by the intrusion detection system, the threat score from each of the corresponding log entries to create an aggregated threat score; and
presenting, by the intrusion detection system, the aggregated threat score.

2. The method of claim 1, wherein updating, on the entry-by-entry basis, the intrusion detection information utilized by the intrusion detection rule comprises updating the running state of the on-going session, login identifications, origin Internet protocol addresses, and commands that are utilized by the intrusion detection rule.

3. The method of claim 1, wherein calculating the threat score from each of the corresponding log entries to create the aggregated threat score comprises calculating the threat score from each of the corresponding log entries in a window according to a login identification.

4. The method of claim 1, wherein calculating the threat score from each of the corresponding log entries to create the aggregated threat score comprises calculating the threat score from each of the corresponding log entries in a window according to an origin Internet protocol address.

5. The method of claim 1, further comprising:
determining, by the intrusion detection system, if an alarm condition has been satisfied by the aggregated threat score; and
if the alarm condition has been satisfied by the aggregated threat score, presenting an alarm.

6. The method of claim 1, wherein the intrusion detection rule further comprises:
generating a list of Internet protocol address blocks associated with a network;
comparing an origin Internet protocol address of each log entry against the list;
determining if any origin Internet protocol addresses are from outside the network;
if one of the origin Internet protocol addresses is from outside the network,
determining that the one of the origin Internet protocol addresses is associated with a breach of the network, and
generating a high threat score for the one of the origin Internet protocol addresses; and
if none of the origin Internet protocol addresses are from outside the network, determining that none of the origin Internet protocol addresses are associated with the breach of the network.

7. The method of claim 1, wherein the intrusion detection rule further comprises:
detecting a failed login attempt for an origin Internet protocol address;
tracking a timestamp of the failed login attempt;
monitoring the origin Internet protocol address for subsequent login attempts within a time period;
determining whether a subsequent login attempt occurs within the time period;
if the subsequent login attempt does not occur within the time period, resetting the timestamp and a count of consecutive failed login attempts;
if the subsequent login attempt occurs within the time period, determining if the subsequent login attempt is successful;
if the subsequent login attempt is successful, resetting the timestamp and the count of consecutive failed login attempts; and
if the subsequent login attempt failed,
updating the timestamp to reflect a new failed login attempt,
incrementing the count of consecutive failed login attempts for the origin Internet protocol address,
determining if the count of consecutive failed login attempts exceeds a threshold count, and
if the count of consecutive failed login attempts exceeds the threshold count,
outputting entries associated with failed login attempts including the failed login attempt and the new failed login attempt, and
assigning a threat score to each of the entries.

8. The method of claim 1, wherein the intrusion detection rule further comprises:
analyzing a log entry;
determining if the log entry includes a modification of a logging setting; and
if the log entry includes the modification of the logging setting, assigning a high threat score to the log entry.

9. The method of claim 1, wherein the intrusion detection rule further comprises:
tracking a most recent date of appearance of an entry and a cumulative number of appearances for the entry;
determining if the most recent date of appearance is older than a time;
if the most recent date of appearance is older than the time, deleting the entry;
if the most recent date of appearance is not older than the time, determining if a threshold number of cumulative appearances of the entry has been reached; and
if the threshold number of cumulative appearances of the entry has been reached, adding the entry to a long-term profile.

10. The method of claim 1, wherein the intrusion detection rule further comprises:
tracking a mean and a variance for an attribute;
estimating running statistics for the attribute during a time period;
determining if a cumulative count for the time period at least meets an attribute count threshold; and
if the cumulative count for the time period at least meets the attribute count threshold, assigning a threat score to an access session involved with the attribute.

11. An intrusion detection system, comprising:
a processor;
and a memory in communication with the processor, the memory comprising instructions that, when executed by the processor, cause the processor to perform operations comprising,
- collecting logs from an authentication, authorization, and accounting logs data store, wherein each of the logs comprises a plurality of entries corresponding with a networking device;
- extracting information from the logs;
- based upon the information extracted from the logs, updating, on an entry-by-entry basis, intrusion detection information utilized by an intrusion detection rule, wherein the intrusion detection rule comprises tracing stepping-stone accesses,
  - determining if a length of an access chain is greater than a threshold length, the threshold length identifying a maximum number of routers considered to correspond with normal operational activities,
  - determining if a fan out of the access chain is greater than a fan out threshold,
  - if the length of the access chain is greater than the threshold length, assigning a high threat score to a stepping-stone session corresponding with the stepping-stone accesses, and
  - if the fan out of the access chain is greater than the fan out threshold, assigning a high threat score to a stepping-stone session corresponding with the stepping-stone accesses;
- updating a profile utilized by the intrusion detection rule;
- comparing the profile and the intrusion detection rule against a running state of an on-going session;
- tagging corresponding log entries of the logs with a threat score;
- calculating the threat scores from the corresponding log entries to create an aggregated threat score; and
- presenting the aggregated threat score.

12. The intrusion detection system of claim 11, wherein the intrusion detection rule further comprises:
- generating a list of Internet protocol address blocks associated with a network;
- comparing an origin Internet protocol address of each log entry against the list;
- determining if any origin Internet protocol addresses are from outside the network;
- if one of the origin Internet protocol addresses is from outside the network,
  - determining that the one of the origin Internet protocol addresses is associated with a breach of the network, and
  - generating a high threat score for the one of the origin Internet protocol addresses; and
- if none of the origin Internet protocol addresses are from outside the network, determining that none of the origin Internet protocol addresses are associated with a breach of the network.

13. The intrusion detection system of claim 11, wherein the intrusion detection rule further comprises:
- detecting a failed login attempt for an origin Internet protocol address;
- tracking a timestamp of the failed login attempt;
- monitoring the origin Internet protocol address for subsequent login attempts within a time period;
- determining whether a subsequent login attempt occurs within the time period;
- if the subsequent login attempt does not occur within the time period, resetting the timestamp and a count of consecutive failed login attempts;
- if the subsequent login attempt occurs within the time period, determining if the subsequent login attempt is successful;
- if the subsequent login attempt is successful, resetting the timestamp and the count of consecutive failed login attempts;
- if the subsequent login attempt failed,
  - updating the timestamp to reflect a new failed login attempt,
  - incrementing the count of consecutive failed login attempts for the origin Internet protocol address,
  - determining if the count of consecutive failed login attempts exceeds a threshold count, and
  - if the count of consecutive failed login attempts exceeds the threshold count,
    - outputting entries associated with failed login attempts including the failed login attempt and the new failed login attempt, and
    - assigning a threat score to each of the entries.

14. The intrusion detection system of claim 11, wherein the intrusion detection rule further comprises:
- analyzing a log entry;
- determining if the log entry including a modification of a logging setting; and
- if the log entry includes the modification of the logging setting, assigning a high threat score to the log entry.

15. The intrusion detection system of claim 11, wherein the intrusion detection rule further comprises:
- tracking a most recent date of appearance of an entry and a cumulative number of appearances for the entry;
- determining if the most recent date of appearance is older than a time;
- if the most recent date of appearance is older than the time, deleting the entry;
- if the most recent date of appearance is not older than the time, determining if a threshold number of cumulative appearances of the entry has been reached; and
- if the threshold number of cumulative appearances of the entry has been reached, adding the entry to a long-term profile.

16. The intrusion detection system of claim 11, wherein the intrusion detection rule further comprises:
- tracking a mean and a variance for an attribute;
- estimating running statistics for the attribute during a time period;
- determining if a cumulative count for the time period at least meets an attribute count threshold; and
- if the cumulative count for the time period at least meets the attribute count threshold, assigning a threat score to an access session involved with the attribute.

17. A computer-readable storage medium comprising computer-executable instructions that, when executed by a processor, cause the processor to perform operations comprising:
- collecting logs from an authentication, authorization, and accounting logs data store, wherein each of the logs comprises a plurality of entries corresponding with a networking device;
- extracting information from the logs;
- based upon the information extracted from the logs, updating, on an entry-by-entry basis, intrusion detection information utilized by an intrusion detection rule, wherein the intrusion detection rule comprises tracing stepping-stone accesses, determining if a length of an access chain is greater than a threshold length, the threshold length identifying a maximum number of routers considered corresponding with normal operational activities, determining if a fan out of the access chain is greater than a fan out threshold, if the length of the access chain is greater than the threshold length, assigning a high threat score to a stepping-stone session corresponding with the stepping-stone accesses, and if the fan out of the access chain is greater than the fan out threshold, assigning a high threat score to a stepping-stone session to correspond with the stepping-stone accesses;

updating a profile utilized by the intrusion detection rule;

comparing the profile and the intrusion detection rule against a running state of an on-going session;

tagging corresponding log entries of the logs with a threat score; calculating the threat scores from the corresponding log entries to create an aggregated threat score;

determining if an alarm condition has been satisfied by the aggregated threat score; and if the alarm condition has been satisfied by the aggregated threat score, presenting an alarm.

18. The computer-readable storage medium of claim 17, wherein calculating the threat scores from the corresponding log entries to create the aggregated threat score comprises one of the following:

summing the threat scores from each of the corresponding log entries in a window according to a login identification; and summing the threat scores from each of the corresponding log entries in a window according to an origin Internet protocol address.

* * * * *